(12) United States Patent
Perrin Guerin

(10) Patent No.: US 10,731,231 B2
(45) Date of Patent: Aug. 4, 2020

(54) STEEL, PRODUCT CREATED FROM SAID STEEL, AND MANUFACTURING METHOD THEREOF

(71) Applicant: APERAM, Luxembourg (LU)

(72) Inventor: Valérie Perrin Guerin, Imphy (FR)

(73) Assignee: APERAM, Luxembourg (LU)

( * ) Notice: Subject to any disclaimer, the term of this patent is extended or adjusted under 35 U.S.C. 154(b) by 114 days.

(21) Appl. No.: 15/767,308

(22) PCT Filed: Oct. 17, 2016

(86) PCT No.: PCT/IB2016/056221
§ 371 (c)(1),
(2) Date: Apr. 10, 2018

(87) PCT Pub. No.: WO2017/064684
PCT Pub. Date: Apr. 20, 2017

(65) Prior Publication Data
US 2019/0062861 A1 Feb. 28, 2019

(30) Foreign Application Priority Data
Oct. 15, 2015 (WO) .................. PCT/IB2015/057939

(51) Int. Cl.
*C21D 9/46* (2006.01)
*C21D 9/00* (2006.01)
*C22B 9/20* (2006.01)
*C22C 1/02* (2006.01)
*C22C 38/00* (2006.01)
*C22C 38/02* (2006.01)
*C22C 38/06* (2006.01)
*C21D 9/30* (2006.01)
*C22C 30/00* (2006.01)
*C22C 38/18* (2006.01)
*C22C 38/14* (2006.01)
*C22C 38/10* (2006.01)
*C22C 38/08* (2006.01)
*C22C 38/12* (2006.01)
*C22C 38/16* (2006.01)
*C21D 1/06* (2006.01)
*C21D 6/00* (2006.01)
(Continued)

(52) U.S. Cl.
CPC .............. *C21D 9/46* (2013.01); *C21D 1/06* (2013.01); *C21D 6/004* (2013.01); *C21D 6/005* (2013.01); *C21D 6/007* (2013.01); *C21D 6/008* (2013.01); *C21D 7/06* (2013.01); *C21D 8/0205* (2013.01); *C21D 8/0226* (2013.01); *C21D 8/0236* (2013.01); *C21D 8/0268* (2013.01); *C21D 9/00* (2013.01); *C21D 9/0068* (2013.01); *C21D 9/30* (2013.01); *C22B 9/20* (2013.01); *C22C 1/02* (2013.01); *C22C 30/00* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/08* (2013.01); *C22C 38/105* (2013.01); *C22C 38/12* (2013.01); *C22C 38/14* (2013.01); *C22C 38/16* (2013.01); *C22C 38/18* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *F16C 3/02* (2013.01); *F16G 5/16* (2013.01); *C21D 2211/004* (2013.01); *C21D 2211/008* (2013.01)

(58) Field of Classification Search
CPC ...... C21D 9/46; C21D 8/0226; C21D 8/0236; C21D 8/0268; C21D 1/06; C21D 9/0068; C21D 7/06; C21D 6/004; C21D 6/005; C21D 6/007; C21D 6/008; C21D 9/30; C22C 38/54; C22C 38/52; C22C 38/50; C22C 38/48; C22C 38/46; C22C 38/44; C22C 38/42; C22C 38/06; C22C 38/04; C22C 1/02; C22C 38/001; C22C 38/002; C22C 38/02; C22C 30/00
See application file for complete search history.

(56) References Cited

U.S. PATENT DOCUMENTS 6,663,730 B2   12/2003  Coutu
8,747,574 B2   6/2014   Ohishi et al.
(Continued)

FOREIGN PATENT DOCUMENTS

| EP | 1 339 880 B1 | 7/2007 |
| EP | 2 412 836 A1 | 2/2012 |
| EP | 2 180 073 B1 | 9/2013 |
| JP | H01-142021 A | 6/1989 |
| JP | 2007-186780 A | 7/2007 |

(Continued)

OTHER PUBLICATIONS

International Search Report, dated Jul. 13, 2016, from corresponding PCT application No. PCT/IB2015/057939.
(Continued)

Primary Examiner — Jessee R Roe
(74) Attorney, Agent, or Firm — Young & Thompson

(57) ABSTRACT

Disclosed is a steel whose composition includes specified wt % of: Ni, Mo, Co, Mo+Co+Si+Mn+Cu+W+V+Nb+Zr+Y+Ta+Cr+C+Al+B+Ti+N, Ni+Co+Mo, Al, Ti, N, Si, Mn, C, S, P, B, H, O, Cr, Cu, W, Zr, Ca, Mg, Nb, V, Ta, Y, the remainder being iron and impurities resulting from production. The inclusion population, observed by image analysis on a polished surface of 650 mm² if the steel is in the form of a hot-formed part or a hot-rolled sheet and 800 mm² if the steel is in the form of a cold-rolled sheet, does not include non-metal inclusions of an equivalent diameter greater than 10 μm. Also disclosed are a product created from the steel, and a manufacturing method.

23 Claims, 4 Drawing Sheets

(51) Int. Cl.
    *C21D 7/06*     (2006.01)
    *C21D 8/02*     (2006.01)
    *C22C 38/04*     (2006.01)
    *C22C 38/42*     (2006.01)
    *C22C 38/44*     (2006.01)
    *C22C 38/46*     (2006.01)
    *C22C 38/48*     (2006.01)
    *C22C 38/50*     (2006.01)
    *C22C 38/52*     (2006.01)
    *C22C 38/54*     (2006.01)
    *F16C 3/02*     (2006.01)
    *F16G 5/16*     (2006.01)

(56) References Cited

U.S. PATENT DOCUMENTS

| | | |
|---|---|---|
| 2010/0189590 A1 | 7/2010 | Ohishi et al. |
| 2018/0087123 A1 | 3/2018 | Perrin Guerin et al. |

FOREIGN PATENT DOCUMENTS

| | | |
|---|---|---|
| JP | 2008-088540 A | 4/2008 |
| WO | 02/40722 A1 | 5/2002 |
| WO | 2016/170397 A1 | 10/2016 |

OTHER PUBLICATIONS

International Search Report, dated Jan. 12, 2017, from corresponding PCT application No. PCT/IB2016/056221.

STEEL, PRODUCT CREATED FROM SAID STEEL, AND MANUFACTURING METHOD THEREOF

The invention relates to the field of so-called «maraging», steels used in particular in applications requiring one or more of the following properties: excellent mechanical properties (very high fatigue strength, high yield strength, and high breaking strength), simple heat treatment and dimensional stability after these treatments, ease of welding and good formability.

These maraging steels are characterized by a martensitic structure able to be aged to obtain hardening, after ageing, via precipitation of intermetallic phases propitious for the obtaining of high mechanical properties.

Conventionally, maraging steels of M 250 type are known having a typical composition (expressed in weight percent as are all the compositions given in the remainder hereof) of Ni=18%, Co=9%, Ti=0.45% (so-called grade X2NiCoMo18-9-5), containing Ti as hardening element, the remainder generally being iron and manufacturing impurities. They are used in particular to form parts with superior properties able to be used both as solid parts (engine shafts, centrifuge blades . . . ) and as high-performance precision parts: clock springs, fencing foil blades, parts of automatic transmission belts of CVT type (Continuous Variable Transmission) for automobiles or vehicles in general, or for machine-tools or other rotating machines. For applications in which a part is subjected to fatigue, it is usual—in addition to ageing—to subject the part to hardening surface treatment by nitriding, carbonitriding, shot peening, carburization . . . .

From document EP-B1-1 339 880, free of Ti maraging steels are also known having the composition: Ni=12 to 24.5%; Mo=2.5%; Co=4.17%; Al≤0.15%; Ti 0.1%; N≤30 ppm; Si≤0.1%; Mn≤0.1%; C≤50 ppm; S≤10 ppm; P≤50 ppm; H≤3 ppm; O≤10 ppm; the remainder being Fe and manufacturing impurities, with Ni+Mo between 20 and 27%; Co %×Mo % between 50 and 200; Ti %×N %≤2.10$^{-4}$, that are produced with methods including treatments of VIM type (Vacuum Induction Melting) and/or VAR type (Vacuum Arc Remelting), optionally coupled with ESR slag remelting (ElectroSlag Remelting). These steels are then hot and cold worked to obtain strips of narrow thickness (1 mm or less for example). After the part has been formed, precipitation hardening is carried out which gives the part its core mechanical properties; subsequent surface treatment can impart increased surface properties thereto to withstand fatigue stresses, static friction, dynamic wear . . . .

Compared with previously known maraging steels containing about 18% Ni, 9% Co, 5% Mo, 0.5% Ti, and some Al, these steels in EP-B1-1 339 880 set themselves apart through higher fatigue strength (in the aged, nitrided state), associated with a controlled inclusion population and fatigue endurance. In more detail: the targeted mechanical properties on a cold rolled product are: Ar>2.5%, $Rp_{0.2}$≤1140 MPa, Rm≤1480 MPa; in the aged state, $Rp_{0.2}$>1770 MPa, Rm>1800 MPa; finally, in the nitrided state the targeted properties are Ar>1%; Rm>1930 MPa.

From document EP-B1-2 180 073 maraging steels with high fatigue and tensile strength are also known, intended for CVT belts, having the composition: C≤100 ppm; Si≤0.1%; Mn≤0.1%; P≤0.01%; S≤50 ppm; Ni=17-22%; Cr=0.1-4.0%; Mo=3.0-7.0%; Co=10.0-20.0%; Ti≤0.1%; Al≤0.05%; N≤300 ppm; O≤50 ppm; 0≤B≤0.01%; optional presence of Ca up to 0.01%, of Mg up to 0.005%, of Zr up to 0.01%, the remainder being Fe and impurities with Co/3+Mo+4 Al between 8.0 and 15.0%. Preferably, the thermal and thermomechanical treatments applied impart a very fine grain thereto, of ASTM 10 or finer.

Also known from patent application PCT/IB2015/052975, to the applicant hereof, are maraging steels combining a composition with low carbon content and controlled inclusion population with a Co content of between 1 and 25% and Mo content between 1 and 12%. The sum Mo+Co, to which there may be added hardening elements, is between 20 and 29%, and the sum Ni+Co+Mo is at least 29%. The contents of high-cost elements, that are best recommended therein, nevertheless remain high.

It is the objective of the invention to propose a novel type of maraging steel having a material cost that is as low as possible, associated with high mechanical properties. In other words, for an application in which the end product will be particularly subjected to fatigue, the steel should exhibit the best compromise possible between relatively low material cost and very good intrinsic mechanical characteristics, associated with excellent surface properties, in respect of nitriding behaviour for example, compared with the steels that have just been described. Sufficient tensile and/or fatigue strength for the aforementioned applications are the desired properties combined with improved surface properties, in particular the capacity during surface treatment to form a nitrided, carbonitrided, carburized, shot blasted or other layer. This layer must be capable of providing residual stresses on the surface allowing delayed cracking under cyclical loads through surface layer compression. The effect of surface treatments can be evaluated for example via the hardness imparted to the product surface, the relative level of residual stresses and the type of phases formed.

For this purpose, the subject of the invention is a steel, characterized in that it has the following composition in weight percent:

10.0%≤Ni≤24.5%, preferably 12.0%≤Ni≤24.5%;
1.0%≤Mo≤12.0%, preferably 2.5%≤Mo≤7.0%;
1.0%≤Co≤18.0%, preferably 4.0%≤Co≤18.0%, better 7.0%≤Co≤16.0%, better still 8.0%≤Co≤15.0%;
14.0%≤Mo+Co+Si+Mn+Cu+W+V+Nb+Zr+Y+Ta+Cr+C+Al+B+Ti+N≤29.0%, preferably 15.0%≤Mo+Co+Si+Mn+Cu+W+V+Nb+Zr+Y+Ta+Cr+C+Al+B+Ti+N≤27.0%, better 17.0%≤Mo+Co+Si+Mn+Cu+W+V+Nb+Zr+Y+Ta+Cr+C+Al+B+Ti+N≤26.0%;
21.5%≤Ni+Co+Mo≤47.5%, preferably 25.0%≤Ni+Co+Mo≤40.0%;
traces≤Al≤4.0%, preferably traces≤Al≤2.0%;
traces≤Ti≤0.1%;
traces≤N≤0.010%;
traces≤Si≤4.0%, preferably ≤2.0%;
traces≤Mn≤13.0% preferably traces≤Mn≤4.0%; better 0.14%≤Mn 4.0%;
preferably Si+Mn≥0.13%;
traces≤C≤0.03%;
traces≤S≤0.0020%, preferably traces≤S≤0.0010%;
traces≤P≤0.005%;
traces≤B≤0.01%;
traces≤H≤0.0005%;
traces≤O≤0.03%;
traces≤Cr≤5.0%, preferably 0.01%≤Cr≤5.0%; better 0.1%≤Cr≤5.0%;
traces≤Cu≤4.0%;
traces≤W≤6.0%;
traces≤Zr≤4.0%;
traces≤Ca≤0.1%;
traces≤Mg≤0.8%;
traces≤Nb≤4.0%; preferably Nb≤2.0%;

traces≤V≤4.0%;
traces≤Ta≤4.0%;
traces≤Y≤4.0%;
preferably traces≤Al+Si+Cu+Nb+Mn+V+Ta+Cr+W+C+B+Y+Zr+Ti+N≤14.0%, better traces≤Al+Si+Cu+Nb+Mn+V+Ta+Cr+W+C+B+Y+Zr+Ti+N≤8.0%; better still 0.14%≤Al+Si+Cu+Nb+Mn+V+Ta+Cr+W+C+B+Y+Zr+Ti+N 8.0%;
preferably Al+Cr≥0.1%, better≥0.17%;
the remainder being iron and manufacturing impurities;
and in that the inclusion population observed by image analysis on a polished surface of 650 mm² if the steel is in the form of a hot worked part or hot rolled sheet, and 800 mm² if the steel is in the form of cold rolled sheet, does not contain non-metallic inclusions having an equivalent diameter larger than 10 μm, and preferably does not contain non-metallic inclusions having an equivalent diameter larger than 8 μm.

A further subject of the invention is a method for producing a steel product, characterized in that:

a remelting electrode is prepared in steel having a composition that conforms to the previously cited composition;

this electrode is remelted using a single or multiple remelting process to obtain a remelted electrode;

the remelted electrode is subjected to at least one hot-working at a temperature of between 1050 and 1300° C., to obtain hot-worked sheet or hot-worked strip;

and optionally said hot-worked sheet or said hot-worked strip is subjected to heat treatment.

Said hot-worked sheet or strip, optionally heat treated, has a Vickers hardness of 285 Hv10 or higher, this hardness being evaluated along a cross-section of the hot-worked part or sheet.

Said hot-worked sheet or said hot-worked strip can then be cold rolled with one or more passes to obtain sheet or strip having a thickness of 2 mm or less, preferably 1 mm or less.

The sheet or strip can be subjected to at least one heat treatment between two cold roll passes and/after the last cold roll pass.

The accumulated cold rolling rate of the various passes is at least 30%, preferably at least 40%.

Said hot or cold rolled sheet or strip, optionally heat treated can have a martensitic structure of at least 70%, tensile strength of 2030 MPa or higher, offset yield strength of 2000 MPa or higher, and uniform elongation of 1% or higher.

Said hot or cold rolled sheet or strip, optionally heat treated, can be cut and optionally formed.

Said hot or cold rolled sheet or strip, optionally heat treated, cut and optionally formed, can undergo hardening treatment at between 400 and 600° C. for 30 min to 5 h, preferably at 420-550° C. for 30 min to 2 h.

Said optionally heat-treated sheet or strip, cut and optionally formed, can be subjected, after hardening, to surface treatment to improve its dynamic yield strength.

Said surface treatment may be carburizing, or gas nitriding, or ion nitriding, or carbonitriding or shot peening.

The grain size of the hot rolled sheet or strip, optionally heat treated, or of the cold rolled sheet or strip optionally heat treated, may be 5 ASTM or finer, preferably 10 ASTM or finer.

A further subject of the invention is a steel product that has been hot worked and optionally heat treated, characterized in that it has the following composition in weight percent:

10.0%≤Ni≤24.5%, preferably 12.0%≤Ni≤24.5%;
1.0%≤Mo≤12.0%, preferably 2.5%≤Mo≤7.0%;
1.0%≤Co≤18.0%, preferably 4.0%≤Co≤18.0%, better 7.0%≤Co≤16.0%, better still 8.0%≤Co≤15.0%;
14.0%≤Mo+Co+Si+Mn+Cu+W+V+Nb+Zr+Y+Ta+Cr+C+Al+B+Ti+N≤29.0%, preferably 15.0%≤Mo+Co+Si+Mn+Cu+W+V+Nb+Zr+Y+Ta+Cr+C+Al+B+Ti+N≤27.0%, better 17.0%≤Mo+Co+Si+Mn+Cu+W+V+Nb+Zr+Y+Ta+Cr+C+Al+B+Ti+N≤26.0%;
21.5%≤Ni+Co+Mo≤47.5%, preferably 25.0%≤Ni+Co+Mo≤40.0%
traces≤Al≤4.0%, preferably Al≤2.0%;
traces≤Ti≤0.1%;
traces≤N≤0.010%;
traces≤Si≤4.0%, preferably ≤2.0%;
traces≤Mn≤13.0% preferably traces≤Mn≤4.0%;
traces≤C≤0.03%;
traces≤S≤0.0020%, preferably traces≤S≤0.0010%;
traces≤P≤0.005%;
traces≤B≤0.01%;
traces≤H≤0.0005%;
traces≤O≤0.03%;
traces≤Cr≤5.0%, preferably 0.01%≤Cr≤5.0%; better 0.1%≤Cr≤5.0%;
traces≤Cu≤4.0%;
traces≤W≤6.0%;
traces≤Zr≤4.0%;
traces≤Y≤4%;
traces≤Ca≤0.1%;
traces≤Mg≤0.8%;
traces≤Nb≤4.0%; preferably Nb≤2.0%;
traces≤V≤4.0%;
traces≤Ta≤4.0%;
traces≤Y≤4.0%;
preferably traces≤Al+Si+Cu+Nb+Mn+V+Ta+Cr+W+C+B+Y+Zr+Y+Ti+N≤14.0%, better traces≤Al+Si+Cu+Nb+Mn+V+Ta+Cr+W+C+B+Y+Zr+Y+Ti+N≤8.0%; better still 0.14%≤Al+Si+Cu+Nb+Mn+V+Ta+Cr+W+C+B+Y+Zr+Ti+N≤8.0%;
preferably Al+Cr≥0.1%, better≥0.17%;
the remainder being iron and manufacturing impurities;
and in that the inclusion population observed by image analysis on a polished surface of 650 mm² of a hot worked part or of hot rolled sheet preferably does not contain non-metallic inclusions having an equivalent diameter larger than 8 μm.

A further subject of the invention is a steel product subjected to hot working of the preceding type, optionally heat treated, characterized in that it has a martensitic structure of at least 70%, tensile strength of 2030 MPa or higher, offset yield strength of 2000 MPa or higher and uniform elongation of 1% or higher, with Vickers hardness of 285 Hv10 or higher, this hardness being evaluated along a cross-section of the hot worked product.

A further subject of the invention is cold rolled sheet or strip in steel, characterized in that it has the following composition in weight percent:

10.0%≤Ni≤24.5%, preferably 12.0%≤Ni≤24.5%;
1.0%≤Mo≤12.0%, preferably 2.5%≤Mo≤7.0%;
1.0%≤Co≤18.0%, preferably 4.0%≤Co≤18.0%, better 7.0%≤Co≤16.0%, better still 8.0%≤Co≤15.0%;
14.0%≤Mo+Co+Si+Mn+Cu+W+V+Nb+Zr+Y+Ta+Cr+C+Al+B+Ti+N≤29.0%, preferably 15.0%≤Mo+Co+Si+Mn+Cu+W+V+Nb+Zr+Y+Ta+Cr+C+Al+B+Ti+N≤27.0%, better 17.0%≤Mo+Co+Si+Mn+Cu+W+V+Nb+Zr+Y+Ta+Cr+C+Al+B+Ti+N≤26.0%;
21.5%≤Ni+Co+Mo≤47.5%, preferably 25.0%≤Ni+Co+Mo≤40.0%;
traces≤Al≤4.0%, preferably Al≤2.0%;

traces≤Ti≤0.1%;
traces≤N≤0.010%;
traces≤Si≤4.0%, preferably ≤2.0%;
traces≤Mn≤13.0% preferably traces≤Mn≤4.0%;
traces≤C≤0.03%;
traces≤S≤0.0020%, preferably traces≤S≤0.0010%;
traces≤P≤0.005%;
traces≤B≤0.01%;
traces≤H≤0.0005%;
traces≤O≤0 0.03%;
traces≤Cr≤5.0%, preferably 0.01%≤Cr≤5.0%; better 0.1%≤Cr≤5.0%;
traces≤Cu≤4.0%;
traces≤W≤6.0%;
traces≤Zr≤4.0%;
traces≤Y≤4%;
traces≤Ca≤0.1%;
traces≤Mg≤0.8%;
traces≤Nb≤4.0%; preferably Nb≤2.0%;
traces≤V≤4.0%;
traces≤Ta≤4.0%;
traces≤Y≤4.0%;
preferably traces≤Al+Si+Cu+Nb+Mn+V+Ta+Cr+W+C+B+Y+Zr+Ti+N≤14.0%, better traces ≤Al+Si+Cu+Nb+Mn+V+Ta+Cr+W+C+B+Y+Zr+Ti+N≤8.0%; better still 0.14%≤Al+Si+Cu+Nb+Mn+V+Ta+Cr+W+C+B+Y+Zr+Ti+N≤8.0%;
preferably Al+Cr≥0.1%, better≥0.17%;
the remainder being iron and manufacturing impurities;
and in that the inclusion population observed by image analysis on a polished surface of 800 mm², does not contain non-metallic inclusions having an equivalent diameter larger than 10 μm, preferably does not contain non-metallic inclusions having an equivalent diameter larger than 8 μm.

It may have been subjected to at least one heat treatment after cold rolling.

Said hot or cold rolled and optionally heat treated sheet or strip can have a tensile strength of 2030 MPa, or higher, an offset yield strength of 2000 MPa or higher and uniform elongation of 1% or higher. On the other hand, dual-phase grades may require adjustment of heat treatments and may exhibit lesser mechanical properties after some heat cycles; however, these grades maintain improved performance under dynamic stress when in use (via strain hardening and phase change) combined with reinforced nitriding.

A further subject of the invention is a steel product, characterized in that it is derived from hot or cold rolled sheet or strip of the preceding type, optionally formed, and in that it has been subjected to surface treatment to improve resistance to dynamic stresses which could lead to initiating surface cracking.

Said surface treatment can be selected from among carburization, gas nitriding, ion nitriding, carbonitriding, shot peening.

A further subject of the invention is a turbine shaft or hot worked transmission part, characterized in that said shaft or said part comprises at least one element formed from a hot worked product of the preceding type.

A further subject of the invention is a transmission belt, characterized in that it comprises at least one element produced from cold rolled sheet or strip of the preceding type, or from a product derived from said sheet or strip.

This may be a transmission belt of CVT type for motor vehicle.

A further subject of the invention is a steel product that has been hot worked and optionally heat treated of the preceding type, or cold rolled sheet or strip optionally heat treated of the preceding type, characterized in that the grain size of the product or of the sheet or strip is 5 ASTM or finer, preferably ASTM 10 or finer.

As will have been understood, to obtain the targeted savings compared with the known prior art, the invention lowers the compulsory or preferred maximum contents of some elements such as Co, and even Mo, in relation to previous recommendations, and offsets this lowering through the compulsory presence in defined contents of hardening elements of Cu, Nb, Mn, Si, Al, Ta, V, W type and others that are usually not systematically used. These grades allow mostly martensitic structures to be obtained which are typical of maraging steels, or also mixed austenite-ferritic structures. The invention is a compromise between material cost and mechanical performance, made possible by mechanical performance due to the composition of the steel and to the thermomechanical or thermal treatments applied, combined with a controlled population of non-metallic inclusions (essentially oxides, sulfides, nitrides), meeting specific criteria of number, distribution, size distribution and composition.

This population can be obtained after careful preparation of the liquid metal by means of a combination of different production processes and operator-controlled conditions. In particular, it is advisable to use new or scarcely degraded refractory linings for vessels such as the melt furnace and liquid metal treatment ladles, and for the purpose of preventing reoxidation and re-nitriding, to avoid contacts between the liquid metal and the atmosphere through the use of vacuum treatments and of protective neutral gases (argon) when the metal is or may be exposed to air. Agitation of the liquid metal in the production vessels in which it is performed must also be controlled (using electromagnetic means or via injection of neutral gas in particular), so as to accelerate decantation of inclusions without however capturing resulting oxidized or other impurities due in particular to erosion of refractory linings or capturing impurities detached from the slag surmounting the liquid metal. These precautions are known per se to those skilled in the art, but it is important that they should be applied in the invention to the best of the known prior art, to avoid crossing of the acceptability threshold for oxide, nitride or sulfide inclusions in the end product, such as determined in the invention.

The steels of the invention, in particular when they have a high Cr or Mn content, or more especially high Cr and Mn content, prove to lend themselves particularly well to the subsequent obtaining of a nitrided layer having mechanical behaviour (low plastic deformation capacity) that affords important advantages in particular when these steels are preferably used to produce elements of CVT transmission belts. From this viewpoint, Cu and Nb are also favourable.

The invention will be better understood on reading the following description given with reference to the following appended Figures.

Figure 1:
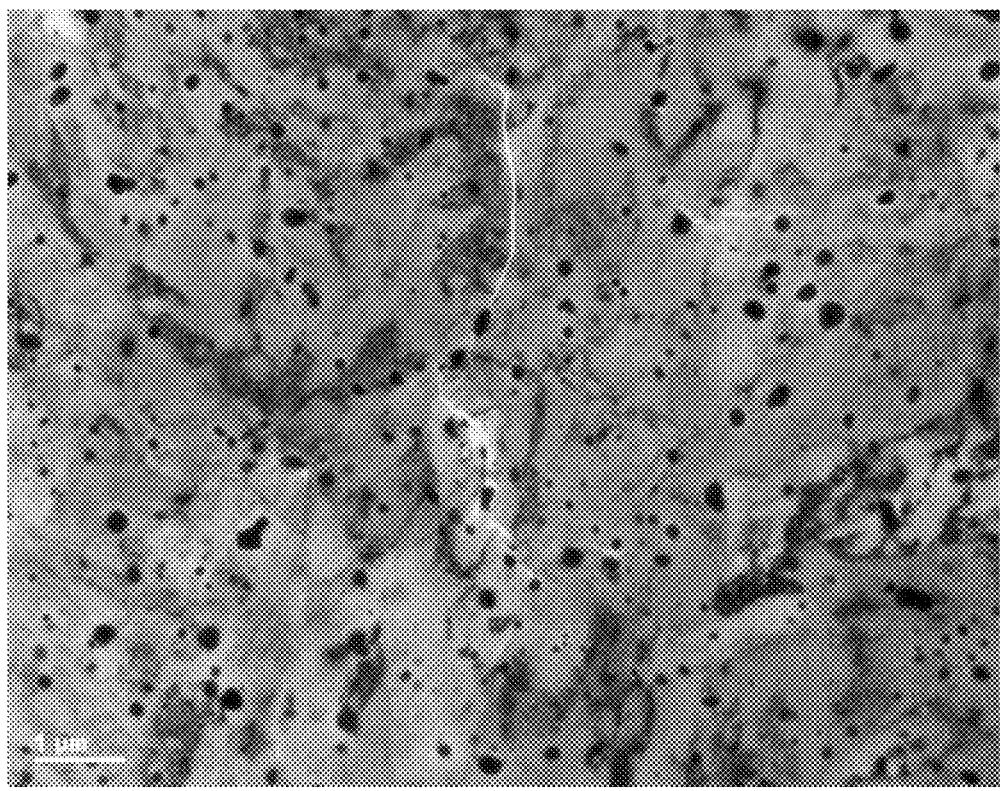
FIG. 1 illustrates the hardening precipitates obtained on sample Inv 15 after gas nitriding, characterized by thin section transmission electron microscopy.

The composition of the steel (expressed in weight percent) is prompted by the following considerations.

The Ni content is between 10.0 and 24.5%, preferably between 12.0 and 24.5%. It is on this condition that:

first, via usual heat treatments, a strongly martensitic structure is obtained i.e. representing at least 30%, better at least 50% on the surface of the structure as seen in a micrograph; a Ni content of more than 24.5%, combined with the required contents for the other elements, would not allow said structure to be obtained irrespective of the heat treatments applied;

secondly, after precipitation hardening, particularly favourable properties of ductility, expansion, yield strength, K1C tenacity are obtained for the envisaged applications; a minimum Ni content of 10.0%, associated with defined proportions of Co, Mo and other metal elements, is adapted for obtaining such properties; a minimum Ni content of 12.0% is further preferred for satisfactorily obtaining of this effect.

The Mo content is between 1.0 and 12.0%. This element allows structural hardening through the formation, on ageing, of $Fe_2Mo$, $MoNi_3$ and other intermetallics that are fine and dispersed. Optimally, the Mo content is 2.5 to 7.0% to obtain both a highly significant Mo effect and intermetallics of optimal size to ensure homogeneity of mechanical properties. The upper limit of Mo is determined by the desire to maintain mostly martensitic structures capable of age hardening.

Since this element is costly, it is of advantage not to add any superfluous amount thereof, as its effects on structural hardening can be partly ensured by other more economical elements.

Mo also plays a part in the forming of and properties of the nitrided layers that contain fine, dispersed precipitates of different types depending on nitriding conditions (precipitates of type $Mo_2N$, $Fe_xMo_yN$, ... ).

The Co content is between 1.0 and 18.0%. This element stabilises the martensitic structure, raises solidus temperatures and indirectly takes part in hardening by promoting precipitation of intermetallics. If the proportions of Co used are higher than 18.0%, the addition becomes high-cost (expensive price of Co) and the properties of the steel may be significantly modified if, at the same time, the contents of the other elements remain within the limits of the invention. Preferably, the Co content is 4.0 to 18.0%, better from 7.0% to 16.0%, better still from 8.0% to 15.0%.

If Co and Mo have controlled contents that can be relatively moderate compared with usual quantities, their action must be completed through the addition of one of more hardening elements, Si, Mn, Cu, W, V, Nb, Zr, C, Al, B, Y, Ta, Cr, Ti, N, within the limits specified elsewhere herein. It is one of the manners, according to the invention, whereby the cost of the steel can be reduced whilst maintaining high-level properties due to structural hardening, in particular if these substitution hardening elements are selected from among the least costly thereof. The same issue applies here as mentioned above with respect to Mo.

The consequence of this requirement regarding the need to have sufficient amounts of Co is that the sum of the hardening elements Mo+Co+Si+Mn+Cu+W+V+Nb+Zr+Ta+Cr+C+Al+B+Y+Ti+N is between 14.0 and 29.0% preferably between 15.0 and 27.0%, better between 17.0 and 26.0%. This implies, since the Co content is at least 1%, preferably at least 4%, that the addition must often be made of at least one element selected from among Si, Mn, Cu, W, V, Nb, Zr, Ta, Cr, C, Al, Y and B (within the limits recommended elsewhere) having regard to the fact that Mo is never higher than 12% (for economic reasons comparable with those leading to limiting of the Co content) and preferably not higher than 7.0%.

The lower limit of 14.0% for this sum is justified by the obtaining of a sufficient hardening effect. Over and above 29.0%, the magnetic properties and conditions of use of the material become significantly modified. Preferably, the lower limit is 15.0%, better 17.0%, to obtain customary values for the most demanding, envisaged applications whilst keeping to an economic grade.

The contents of Ni, Co, Mo are also dependent on one another, in that:

Ni improves ductility (in particular at low temperatures) and allows controlled expansion and elastic modulus; it also has an effect on toughness and the Re/Rm ratio; the contents thereof are limited: lower limit to benefit from the cited favourable properties (in general on and after 5% for alloys) and upper limit so as not to hamper martensitic transformation due to its gammagenic nature; for this effect, the impacts of Co and Mo must also be taken into account;

Mo is added for the purpose of structural hardening via precipitation of intermetallics; and in order to obtain the fracture properties of maraging grades, an ageing martensitic structure is desirable; Mo participates in this hardening as mentioned above (on and after 1%) and can take part in structural hardening jointly with the proposed addition elements (such as Nb for example); Mo also takes part in the nitriding of surfaces via its affinity for nitrogen (on and after a few %); finally, it only comes up against limits in the formation of weakening phases (Laves phases, σ, μ, θ, δ . . . ), possibly being associated with local segregations; its upper limit is 12.0%.

Finally, regarding the formation of an ageing martensitic structure, the elements Co and Mo act jointly with regard to precipitation of hardening phases, but separately with regard to stabilisation of ferritic structures. To unify these tendencies, a formula is proposed in order to preferably guarantee a Ms temperature above ambient temperature:

21.5%≤Ni+Co+Mo≤47.5%, preferably 25.0%≤Ni+Co+Mo≤40.0%.

The Al content is between traces and 4.0%, preferably between traces and 2.0%. Al is not necessarily added, but it belongs to those elements that can be used to offset low Co contents having regard to mechanical performance. Its presence can be reduced to that of a residual element resulting from the quantity that it may have been necessary to add for initial deoxidation of the liquid metal during production, or a voluntary addition of Al that may have been made in order to obtain specific properties. For a moderate cost, it increases resilience and can take part in structural hardening. Also, it limits oxidation when preparing the liquid metal and working the solidified metal. However, the formation of inclusions of significant size must be avoided when hot processing (of aluminium-containing nitride and oxide types) so as not to degrade fatigue strength and toughness. By limiting the presence of Al to this preferred content of less than 2.0%, this risk can be limited. At all events, a significant presence of Al must take place alongside careful preparation conditions, which avoid major reoxidation of the liquid metal, and enhance decanting and trapping in slag of any clusters of alumina inclusions which may have resulted from deoxidation and reoxidation.

Like Ti, aluminium promotes nitriding but does not allow easy controlling of the formed phases. Therefore, precipitates of non-controlled size may form at different steps of liquid steel production and hot working of the solidified semi-finished product, and they may have a dramatic effect on fatigue properties.

The Ti content is therefore between traces and 0.1%. By avoiding a significant presence of Ti (required by other maraging steels contrary to those of the invention) it is sought to prevent the formation of Ti nitrides during solidification of the liquid metal, which deteriorate the fatigue strength of the end product. In the invention, the desired structural hardening is obtained by other means.

The N content, which at most is 0.010%, may be necessitated at low level in the presence of nitridable addition elements (type Al, Ti), to prevent the formation of nitrides in liquid phase inasmuch as possible. With the exception of these cases, or if the most harmful nitrides can assuredly be removed by decanting at the time of preparation and casting, the tolerable N content of no more than 0.010% is often simply obtained passively through the quality of the raw materials, production processing and liquid metal casting.

The Si content is between traces and 4.0%. It can be used for deoxidation of the liquid metal during preparation thereof, and it belongs to those elements that can be used to offset the relatively low Co contents. The presence of Si may also contribute, even in the presence of Al, to the capturing of part of dissolved oxygen which will therefore be less available to form harmful large clusters of alumina. However, the formation of large Si-containing oxides must be avoided in the final solidified steel, hence the preferred upper limit of 2.0%. Si increases the solubility of some elements and thereby homogenizes structure. Finally, it improves yield strength. This relatively high maximum Si content is acceptable insofar as the necessary precautions to obtain an inclusion population confirming to the invention were taken at the time of production and casting.

The Mn content is between traces and 13.0%, preferably between traces and 4.0%, better between 0.14% and 4.0%. Mn improves nitriding since it increases the solubility of nitrogen in solid phase. It also traps free sulfur and thereby limits weaknesses when hot working. In addition, Mn is an efficient deoxidant and, in this respect, can act in synergy with Si, and the capturing by Mn of part of dissolved oxygen, as with Si and also Cr (see further on), allows distribution of dissolved oxygen between different elements other than Al, and thereby limits the risk of formation of large clusters of alumina inclusions. However, its content is preferably limited to 4.0% to prevent the formation of phases detrimental to mechanical properties, and to prevent a drastic increase in the proportion of austenite. Mn promotes stabilisation of dual-phase ferrite-austenite grades (containing less than 70% martensite) having properties to be adjusted. In this context, adjustment of the proportions thereof must be fine-tuned, as must be the conditions for heat treatment and mechanical deformation, to obtain precise control over resulting phase changes and properties. A content exceeding 13.0% risks leading to the formation of inclusions or phases with high Mn content, of large size, and to large proportions of austenite which may degrade mechanical properties.

A minimum of 0.14% may be preferred to start obtaining a significant benefit from the above-cited advantages of Mn.

Preferably, and independently of the preferred conditions set forth individually for Si and Mn, the sum of Si+Mn is at least 0.13%. With this preference it is first ensured that there is a significant amount of at least one deoxidizing element other than Al which may be present, this other deoxidant (like Cr) contributing to limiting the amount of O trapped by Al with the risk of forming large clusters of alumina; secondly, Si and Mn belong to the hardening elements that are preferably added according to the invention to substitute partly for Co and Mo, and since they are low-cost and have no harmful secondary effects within the specified ranges, they are both (even more so when used jointly) a means of high economic interest for reaching the targeted structural hardening.

The C content is between traces and 0.03%. For the grades of the invention in which carbide-generating elements have been added, such as Nb, carbon contents of 0.007% or lower can be preferred in the absence of the addition of chromium. In this manner, mild martensite is formed, since carbon martensite is fragile and does not allow forming needed by the product. It is also desired to prevent the formation of large carbides which would degrade mechanical properties, since some of these hardening elements substituting for Co tend to promote precipitation of carbides. A controlled C content within the specified limits is therefore required or preferred.

The S content is between traces and 0.0020%, preferably between traces and 0.0010%, to avoid the formation of sulfides which would degrade fatigue strength if contained in number and in large size. In addition, S weakens grain boundaries by segregating thereat, hence the possible formation of cracks when the steel is subjected to stresses. The presence of dissolved S must therefore be avoided via careful selection of raw materials and/or deep desulfurization of the liquid metal. The precise tolerable maximum content is to be adjusted according to targeted applications, in manner known per se (within the limit of 0.0020% at most, as specified above).

The P content is between traces and 0.005%, preferably less, to limit the possible segregation thereof at the grain boundaries, similar to S.

B may be present as traces but a voluntarily addition thereof may be preferred of up to 0.01%. This element promotes structural refining and reduces grain size. It is helpful for mechanical properties but it must not be added in too great an amount to prevent loss of ductility.

The H content is limited to 5 ppm to avoid problems of weakening by hydrogen. The conducting of one or more vacuum treatments when preparing the liquid metal and the avoiding of subsequent contamination of the liquid metal by ambient humidity, slag, or of any added materials, generally allows this level to be heeded.

The tolerable O content would technically depend on the envisaged applications of the end product, as for the tolerable contents of S, B, N and other residuals or elements possibly forming precipitates. The maximum content is set at 0.030% (300 ppm), which results from the implementation of methods usually used to prepare liquid metal. The aim is to avoid having oxides in the end product, the composition, distribution and size of which could not be controlled. For this purpose, an addition of Al or of another oxidizable element within the limits determined herein, contributes to obtaining a low O content (e.g. 16 ppm or lower) and avoids the presence of large oxides provided the quality of production is well controlled avoiding reoxidation of the liquid metal inasmuch as is possible by the atmosphere and refractory materials.

The Cr content is between traces and 5.0%, preferably between 0.01% and 5.0%, better between 0.1% and 5.0%. Its presence is therefore not absolutely compulsory but it has the advantage of increasing resistance to oxidation, increasing mechanical properties and of aiding nitriding. On the other hand, Cr like Mn is a gammagenic element which extends the temperature stability domain of austenite, by spacing apart the As/Af, Ms/Mf transformation points. The upper limit of 5% is justified by the desire to avoid drastic accentuation of this effect.

Cr also has a beneficial impact on the properties of the nitrided layer which may have been formed on the product formed from a steel of the invention: it reduces the cracking propensity thereof. This effect is increased in the presence of a significant amount of Mn.

Preferably the sum Al+Cr is at least 0.1%, better at least 0.17%, so that the oxide-forming oxygen is able to be distributed between Al and Cr, thereby limiting the risk of formation of large inclusions.

The Cu content is between traces and 4%. It belongs to those elements that can be voluntarily added and not only passively admitted as an impurity, to offset low Co contents. Addition thereof, if any, must be limited since Cu is gammagenic and reduces martensitic ageing. When added in controlled proportions, Cu takes part in hardening (jointly with Mo) and improves resistance to oxidation.

The W content is between traces and 6.0%. It is therefore not compulsory and can chiefly be added when it is desired to impose a low Co, or even Mo, content, as seen above, so that it contributes towards structural hardening.

The Zr content is between traces and 4.0%. It may be desired to add this element so that it contributes towards deoxidation, and also towards the formation of fine nitrides, so that N does not form nitrides that are too large if elements likely to produce the same (Al in particular since the massive presence of Ti at all events is to be avoided) are present in very significant amounts. Zr is also included in the hardening elements that can be substituted for Mo and Co.

Ca and Mg can be found in the metal due to wear of refractory materials and steelmaking products, in the form of oxides or sulfides. It may also be desired voluntarily to add these elements so that they contribute towards deoxidation and towards control over the composition of the oxidized inclusions, thereby determining their propensity, in conjunction with Al and Si in particular, to form oxides that will be able to coalesce and decant easier than inclusions of pure alumina, and rendering malleable any inclusions that may still subsist at forming steps, reducing the harmfulness thereof. The final content must be limited to 0.1% for Ca and 0.8% for Mg, to prevent the formation of oxides, the size and distribution of which could not be controlled.

Y, Nb, Ta and V can be added up to 4.0% each. They belong to the hardening elements that can be used to offset low contents of Co and Mo.

In addition, Ta and Y help towards forming oxides of small size, and Nb and V promote the formation of small carbides. These elements therefore help towards reaching the characteristics of the invention regarding control over the size of inclusions. Nb also has a beneficial impact on the elastic return of the nitrided layers (under low loading).

Finally, preferably, traces≤Al+Si+Cu+Nb+Mn+V+Ta+Cr+W+C+B+Y+Zr+Ti+N≤14.0%, better traces≤Al+Si+Cu+Nb+Mn+V+Ta+Cr+W+C+B+Y+Zr+Ti+N≤8.0%, better still 0.14%≤Al+Si+Cu+Nb+Mn+V+Ta+Cr+W+C+B+Y+Zr+Ti+N≤8.0%. By limiting the value of the sum of these contents, it is sought not to exaggerate the hardening effects that substitution of these elements for Co and Mo could have, and their secondary effects on the other properties of the steel. The minimum value of at least 0.14% for this sum corresponds to the amount required when it is voluntarily desired to substitute at least one of these hardening elements for Co and Mo.

It is to be understood that the contents qualified as being «preferable» for some elements, or for the sums of the contents of some elements, are independent of one another. Without departing from the invention, it is possible to pay heed to one or more of said preferable conditions and not to pay heed to the others.

Among these preferred conditions, those best recommended are those concerning the sum Al+Cr≥0.17% and Si+Mn≥0.13%. Paying heed to at least one of these two conditions proves to be particularly advantageous for optimisation of the desired results, in terms of control over inclusions, mechanical properties and also nitriding capability associated with good behaviour of the nitrided layer when the end product is in use.

Non-cited elements are at most only present in the state of manufacturing impurities and are not voluntarily added.

Regarding the inclusion population, the criterion to be heeded according to the invention is that this inclusion population—observed under image analysis on a polished surface of 650 mm$^2$ if the steel is in the form of a hot worked part or sheet, and of 800 mm$^2$ if the steel is in the form of cold rolled sheet—does not contain non-metallic inclusions having an equivalent diameter larger than 10 μm, preferably no inclusions of size larger than 8 μm.

With regard to a hot worked part or sheet, this population optimally does not contain more than two and preferably not more than 1.5 non-metallic inclusions having an equivalent diameter larger than 1.5 μm per mm$^2$ of hot worked sheet, observation being performed by SEM image analysis covering at least 200 mm$^2$, conducted for example on a polished surface of 650 mm$^2$.

The non-metallic inclusions under consideration are oxides, sulfides and nitrides. The population of oxides is chiefly controlled by the choice of production methods (strong deoxidation of the liquid metal after which care is taken to remove the large inclusions inasmuch as possible, in particular by using remelting methods of the electrode initially cast from the liquid metal). The population of sulfides is controlled by imposing very low S contents, requiring careful choice of raw materials and/or desulfurization of the liquid metal. The population of nitrides is controlled by imposing low or very low N contents, for example through the use of reduced pressures when preparing the liquid metal and remelting of the electrode, and through limiting the Ti content of the metal.

The steels of the invention are prepared via the following routes for example but not limited thereto.

The steel, first prepared in the liquid state in an arc furnace, and optionally also in a ladle, in order to adjust the essential constituents of the composition thereof, is then cast in the form of remelting electrodes. These electrodes are:

either remelted once under a vacuum (VIM process: Vacuum Induction Melting or VAR process: Vacuum Arc Remelting known per se), or by Electro Slag Remelting (ESR process, known per se) to form, after casting and solidification of the liquid steel, ingots, billets or slabs;

or remelted several times under a vacuum (VAR process: Vacuum Arc Remelting) or by Electro Slag Remelting (ESR) to form, after casting and solidification, ingots or slabs.

Therefore, after preparing and casting in electrode form, either single remelting of the electrode or multiple remelting of the electrode are carried out e.g. VAR+VAR or ESR+VAR. These remeltings allow purification of the metal and improve the quality of solidification by reducing segregations and refining the solidification structure. In particular, ESR remelting allows efficient lowering of the sulfur content and VAR remelting allows efficient lowering of nitrogen contents.

The ingots or slabs are then hot rolled after heating to between 1050 and 1300° C., typically in the region of 1200° C., to obtain hot rolled sheet or strip having a thickness of a few millimetres e.g. about 1.5 à 5 mm thick. For grades containing gammagenic elements in contents higher than 10% for example, it may be appropriate to control cooling of the sheet to promote the formation of martensite and prevent the continued subsisting of an amount of austenite that could prove to be too high. This is notably the case for steels containing Mn. Via experimentation, persons skilled in the art will be able to determine whether, for the specific case of the steel it is desired to obtain with available tooling, said controlled cooling could be helpful.

Hot rolled products having this thickness may, in some cases, be used either as hot rolled, or they can be hot formed, or used in a state of controlled recrystallization. Recrystallization may already have sufficiently occurred after hot rolling and spool winding of strip which amounts to true heat treatment, but if it is insufficient to obtain the desired microstructure and/or mechanical properties, recrystallization annealing can subsequently be carried out to adjust this structure. In this latter case, those skilled in the art are able to adjust the recrystallization annealing parameters (temperature, time . . . ) to adjust the microstructure (grain size in particular) and the desired mechanical properties.

Typically, after hot rolling and optional recrystallization (see other types of heat treatments) the targeted Vickers hardness values are 285 Hv10 or higher. This suggests tensile strength of 950 MPa or higher, and uniform elongation of 5% or higher.

Hardness is evaluated along a cross-section of hot sheet. The targeted structures for hot rolled, pickled products are fine structures preferably having an austenite grain size number of 10 or higher as per standard ASTM E112, for which it is recalled that the figure giving grain size is higher the finer the grain size.

It is also possible that this hot rolled strip, optionally having been heat treated, is not intended to be used directly, and it is then necessary to reduce the thickness thereof by cold forming for the envisaged applications. In this case, they are pickled, then cold rolled with one or more intermediate annealing operations between the different passes of cold rolling, and optionally on one or final annealing operations for ageing, recrystallization or other types of heat treatments, or appropriate surface treatments depending on the targeted application (which will be detailed below) to obtain cold rolled strip having a thickness of less than 2 mm, preferably 1 mm or less, for example a thickness of 0.4 mm or 0.2 mm.

Recrystallization treatment of the cold rolled strip is preferably performed at a thickness such that the cold rolled strip, at the time of this treatment, has a strain hardening rate higher than 30%, better higher than 40%. It imparts a grain size to the strip that is preferably ASTM 10 (mean grain diameter of less than 10 μm) or finer (as per standard ASTM E112).

Annealing treatment intended to obtain a fine grain and/or relaxation of stresses and/or normalisation of the metal is conducted in a protective atmosphere by suitably adjusting the parameters of temperature and time. These parameters are dependent on the particular conditions for heat treatment and those skilled in the art are able to determine these parameters for each particular case.

The preferred requirements regarding the grain size of cold rolled products, optionally heat treated, are also preferably valid for the products intended to be used in the hot rolled state, optionally after being subjected to heat treatment.

To improve strip planarity and if necessary to improve martensitic transformation, the strip may also be subjected to a final skin-pass with a reduction rate of between 1 and 20%.

Typically, hardening (ageing) treatments of cold rolled strip are preferably performed at a thickness such that the cold rolled strip, at the time of this treatment, has a strain hardening rate higher than 30%, better higher than 40%.

A part can then be cut out of the strip and formed e.g. by folding, welding . . . , and hardening treatment performed thereupon whereby it is held at between 400 and 600° C. for 30 min to 5 h. (preferably at 420-550° C. for 30 min to 2 h, for example at 420° C. for 30 min or 480° C. for 2 h).

Hot rolled products are also able to be subjected to hardening treatment, typical of maraging steels, with the benefits conventionally expected from said treatment on the mechanical properties thereof.

Products derived from at least 70% martensitic grades, cold rolled and optionally heat treated, according to the invention, can allow the reaching of tensile strength values Rm of at least 2030 MPa, an offset yield strength $Rp_{0.2}$ of at least 2000 MPa, and elongation $A_{(5,65)}$ of at least 1%. The products derived from dual-phase ferrite-austenite grades on the other hand have lesser mechanical properties after certain heat cycles but maintain increased performance under dynamic stress in use (strain hardening, reinforced phase change and nitriding).

These characteristics can optimally be achieved on hot rolled products subjected to adequate heat treatment.

The products can then be surface hardened (by nitriding, carburization, carbonitriding, shot peening . . . ) to increase their fatigue performance. The surface hardness Hv0.1 can typically be at least 950 without nitriding processes and conditions being necessary other than those operating processes and conditions known to skilled persons.

Experiments were conducted on samples of a steel conforming to the invention (denoted Inv) and on reference samples (denoted Ref), the compositions of which are summarized in Table 1, expressed in weight %. The remainder is iron and manufacturing impurities of no importance for the properties under consideration. The sign «-» means that the element is only contained in the sample in traces or in very small amounts, and having no metallurgical effects.

TABLE 1

Compositions of the tested samples

| | Ni | Co | Mo | Ti | Al | Cr | V | Ta | Cu | Nb | Mn | W | Si | Ni + Co + Mo |
|---|---|---|---|---|---|---|---|---|---|---|---|---|---|---|
| Ref 1 | 18.11 | 16.50 | 5.30 | — | 0.02 | 0.081 | — | — | 0.110 | — | 0.074 | — | 0.047 | 39.91 |
| Ref 2 | 17.70 | 9.10 | 4.99 | 0.457 | 0.11 | — | — | — | — | — | — | — | 0.008 | 31.79 |
| Inv 1 | 17.70 | 12.98 | 4.95 | — | — | 0.021 | 0.44 | — | — | — | 0.291 | — | <0.010 | 35.63 |
| Inv 2 | 17.90 | 12.60 | 4.98 | — | — | 0.082 | 2.02 | — | — | — | 0.273 | — | 0.021 | 35.48 |
| Inv 3 | 18.20 | 12.20 | 5.02 | — | — | 0.157 | 3.95 | — | — | — | 0.250 | — | 0.042 | 35.42 |
| Inv 4 | 18.30 | 12.20 | 7.10 | — | — | 0.159 | 3.99 | — | — | — | 0.240 | — | 0.034 | 37.60 |
| Inv 5 | 17.90 | 13.20 | 5.00 | — | — | — | — | 0.12 | — | — | 0.217 | — | <0.010 | 36.10 |
| Inv 6 | 17.90 | 13.00 | 5.00 | — | — | 0.005 | — | 0.53 | — | — | 0.218 | — | <0.010 | 35.90 |
| Inv 7 | 18.20 | 12.60 | 4.80 | — | — | 0.006 | — | 2.84 | — | — | 0.213 | — | 0.014 | 35.60 |
| Inv 8 | 18.40 | 12.70 | 4.90 | — | 0.80 | 0.197 | — | 2.95 | — | — | 0.216 | — | 0.014 | 36.00 |
| Inv 9 | 17.70 | 13.10 | 5.00 | 0.015 | — | 0.005 | — | 0.009 | 0.190 | — | 0.288 | — | 0.020 | 35.80 |
| Inv 10 | 17.80 | 13.10 | 5.00 | 0.016 | — | 0.005 | — | 0.009 | 0.800 | — | 0.278 | — | 0.016 | 35.90 |
| Inv 11 | 17.70 | 13.00 | 5.00 | 0.016 | — | 0.005 | — | 0.009 | 2.060 | — | 0.274 | — | 0.020 | 35.70 |
| Inv 12 | 17.90 | 13.10 | 7.00 | 0.020 | — | 0.010 | — | 0.004 | 4.060 | — | 0.263 | — | 0.013 | 38.00 |
| Inv 13 | 18.10 | 13.01 | 5.32 | — | 0.02 | 0.908 | — | — | 2.010 | — | 0.167 | — | 0.033 | 36.43 |
| Inv 14 | 17.73 | 13.00 | 4.95 | 0.015 | — | 0.006 | — | 0.008 | — | 0.21 | 0.291 | — | 0.012 | 35.68 |
| Inv 15 | 17.77 | 12.90 | 4.95 | 0.016 | — | 0.006 | — | 0.013 | — | 0.82 | 0.278 | — | 0.010 | 35.62 |
| Inv 16 | 18.06 | 12.80 | 4.97 | 0.016 | — | 0.007 | — | 0.023 | — | 1.87 | 0.270 | — | 0.014 | 35.83 |
| Inv 17 | 18.50 | 12.60 | 6.46 | 0.019 | 0.01 | 0.100 | — | 0.043 | — | 3.77 | 0.259 | — | 0.024 | 37.56 |
| Inv 18 | 18.20 | 12.86 | 5.31 | — | 0.02 | 0.037 | — | — | 0.094 | 0.793 | 0.174 | — | 0.038 | 36.37 |
| Inv 19 | 18.22 | 12.89 | 5.26 | — | 0.01 | 0.883 | — | — | 0.084 | 0.775 | 0.144 | — | 0.033 | 36.37 |
| Inv 20 | 17.69 | 13.00 | 4.96 | 0.016 | — | 0.006 | — | — | — | — | 0.780 | — | 0.010 | 35.65 |
| Inv 21 | 17.73 | 13.00 | 4.96 | 0.015 | — | 0.007 | — | — | — | — | 1.970 | — | <0.010 | 35.69 |
| Inv 22 | 17.87 | 13.00 | 4.95 | 0.015 | — | 0.010 | — | — | — | — | 3.920 | — | <0.010 | 35.82 |
| Inv 23 | 17.94 | 12.80 | 4.84 | 0.015 | 0.01 | 0.012 | — | — | — | — | 7.830 | — | 0.014 | 35.58 |
| Inv 24 | 18.19 | 13.00 | 5.31 | — | 0.01 | 0.902 | — | — | 0.095 | — | 1.930 | — | 0.309 | 36.50 |
| Ref 25 | 10.10 | 2.26 | 1.98 | — | 0.54 | 0.007 | — | — | — | — | 13.54 | — | 0.044 | 14.34 |
| Ref 26 | 18.24 | 5.02 | 4.99 | 0.007 | 0.62 | 0.011 | — | — | — | — | 13.57 | — | 0.047 | 28.25 |
| Inv 27 | 17.80 | 5.20 | 4.90 | 0.006 | 0.25 | 0.005 | — | — | — | — | 0.0053 | 0.20 | 0.036 | 27.90 |
| Inv 28 | 17.90 | 5.20 | 4.90 | 0.006 | 0.24 | 0.005 | — | — | — | — | 0.0065 | 0.80 | 0.034 | 28.01 |
| Inv 29 | 18.00 | 5.10 | 4.80 | 0.006 | 0.25 | 0.005 | — | — | — | — | — | 1.90 | 0.036 | 27.90 |
| Inv 30 | 18.00 | 4.80 | 4.50 | 0.006 | 0.24 | 0.005 | — | — | — | — | — | 3.70 | 0.025 | 27.23 |
| Inv 31 | 17.90 | 7.20 | 5.00 | 0.006 | 0.24 | 0.007 | — | — | — | — | 0.0058 | 0.20 | 0.029 | 29.99 |
| Inv 32 | 17.90 | 7.10 | 4.90 | 0.006 | 0.24 | 0.007 | — | — | — | — | 0.0051 | 0.70 | 0.032 | 29.90 |
| Inv 33 | 18.10 | 7.00 | 4.80 | 0.006 | 0.24 | 0.007 | — | — | — | — | 0.0055 | 2.10 | 0.031 | 29.90 |
| Inv 34 | 19.40 | 6.80 | 4.70 | 0.006 | 0.24 | 0.006 | — | — | — | — | — | 4.20 | 0.028 | 30.90 |
| Inv 35 | 17.88 | 10.11 | 4.94 | 0.007 | 0.24 | 0.006 | — | — | — | — | — | 0.20 | 0.038 | 32.93 |
| Inv 36 | 17.88 | 10.01 | 4.91 | 0.007 | 0.24 | 0.005 | — | — | — | — | — | 0.82 | 0.030 | 32.80 |
| Inv 37 | 18.08 | 9.82 | 4.81 | 0.006 | 0.24 | 0.006 | — | — | — | — | — | 1.96 | 0.033 | 32.71 |
| Inv 38 | 19.42 | 9.57 | 4.70 | 0.006 | 0.25 | 0.006 | — | — | — | — | — | 3.94 | 0.033 | 33.69 |
| Inv 39 | 17.90 | 5.11 | 4.93 | — | 0.20 | — | — | — | — | — | 0.037 | — | <0.010 | 27.94 |
| Inv 40 | 17.98 | 2.09 | 4.97 | — | 0.57 | — | — | — | — | — | — | — | <0.010 | 25.04 |
| Inv 41 | 18.01 | 2.11 | 4.97 | — | 0.88 | — | — | — | — | — | — | — | <0.010 | 25.09 |
| Inv 42 | 17.95 | 2.11 | 4.96 | — | 0.51 | 0.201 | — | — | — | — | — | — | <0.010 | 25.02 |
| Inv 43 | 17.92 | 2.10 | 4.97 | — | 0.52 | 0.474 | — | — | — | — | — | — | 0.016 | 24.99 |
| Inv 44 | 17.90 | 5.30 | 5.00 | 0.006 | 0.66 | 0.200 | — | — | — | — | 0.0069 | — | 0.025 | 28.17 |
| Inv 45 | 17.90 | 5.20 | 4.99 | 0.006 | 0.85 | 0.200 | — | — | — | — | 0.0067 | — | 0.027 | 28.12 |
| Inv 46 | 17.90 | 7.20 | 4.99 | 0.006 | 0.85 | 0.200 | — | — | — | — | 0.0055 | — | 0.030 | 30.09 |
| Inv 47 | 18.00 | 10.20 | 5.00 | — | 0.86 | 0.200 | — | — | — | — | 0.0052 | — | 0.028 | 33.20 |
| Inv 48 | 17.95 | 5.24 | 5.00 | 0.109 | 0.86 | 0.006 | — | — | — | — | 0.0107 | — | 0.123 | 28.19 |
| Inv 49 | 17.97 | 7.20 | 5.00 | 0.109 | 0.85 | 0.007 | — | — | — | — | 0.0119 | — | 0.120 | 30.17 |
| Ref 50 | 17.89 | 5.26 | 4.99 | 0.006 | 0.85 | 0.005 | — | — | — | — | 0.0068 | — | 0.124 | 28.14 |
| Ref 51 | 17.87 | 7.24 | 5.03 | 0.007 | 0.84 | 0.006 | — | — | — | — | 0.0066 | — | 0.127 | 30.14 |
| Ref 3 | 18.04 | 9.96 | 4.87 | — | 4.48 | 0.005 | — | — | — | — | 0.063 | — | 0.027 | 32.87 |
| Ref 4 | 18.04 | 16.21 | 4.89 | — | — | — | — | — | — | — | — | — | 0.021 | 39.14 |
| Ref 5 | 18.04 | 18.57 | 4.74 | — | — | — | — | — | — | — | — | — | 0.035 | 41.35 |
| Inv 52 | 17.96 | 5.12 | 4.97 | 0.01 | 0.80 | 0.005 | — | — | — | — | 0.008 | — | 0.124 | 28.05 |
| Inv 53 | 18.05 | 7.18 | 4.86 | 0.008 | 0.82 | 0.006 | — | — | — | — | 0.009 | — | 0.127 | 30.09 |
| Inv 54 | 17.96 | 16.07 | 9.89 | — | 0.01 | 0.02 | — | — | — | — | 0.11 | — | 0.09 | 43.92 |
| Inv 55 | 18.05 | 16.30 | 11.83 | — | 0.02 | 0.01 | — | — | — | — | 0.10 | — | 0.08 | 46.18 |
| Inv 56 | 18.04 | 8.14 | 5.06 | — | 2.63 | 0.005 | — | — | — | — | 0.006 | — | 0.029 | 31.24 |
| Inv 57 | 18.16 | 9.98 | 5.06 | — | 3.63 | 2.2 | — | — | — | — | — | — | 0.008 | 33.20 |
| Inv 58 | 18.24 | 10.14 | 5.06 | — | 4.63 | 4.6 | — | — | — | — | — | — | 0.007 | 33.44 |
| Inv 59 | 18.04 | 8.14 | 5.06 | — | 2.63 | 0.005 | — | — | — | — | 0.006 | — | 1.97 | 31.24 |
| Inv 60 | 18.04 | 16.03 | 4.70 | — | 0.01 | 0.005 | — | — | — | — | — | — | 0.03 | 38.77 |
| Ref 6 | 18.04 | 8.14 | 5.06 | — | 2.48 | — | — | — | — | — | — | — | 2.04 | 31.24 |
| Inv 61 | 18.16 | 9.98 | 5.06 | — | 3.48 | 0.04 | — | — | — | — | — | — | 0.21 | 33.20 |

| | S | Mg | Zr | Y | B | C | N | P | H | O | Ca |
|---|---|---|---|---|---|---|---|---|---|---|---|
| Ref 1 | 0.0003 | — | — | — | — | 0.003 | 0.0015 | 0.003 | <0.00002 | <0.0005 | <0.0005 |
| Ref 2 | <0.0005 | — | — | — | — | 0.002 | 0.0007 | <0.002 | <0.00002 | 0.0020 | <0.0005 |
| Inv 1 | <0.0005 | — | — | — | 0.0004 | 0.002 | 0.0009 | <0.003 | <0.00002 | 0.0036 | <0.0005 |
| Inv 2 | <0.0005 | — | — | — | 0.0004 | 0.002 | 0.0043 | <0.003 | <0.00002 | 0.0088 | <0.0005 |
| Inv 3 | 0.0008 | — | — | — | 0.0005 | 0.002 | 0.0068 | <0.003 | <0.00004 | 0.0073 | <0.0005 |
| Inv 4 | 0.0007 | — | — | — | 0.0007 | 0.002 | 0.0057 | <0.003 | <0.00002 | 0.0073 | <0.0005 |

TABLE 1-continued

Compositions of the tested samples

| Sample | | | | | | | | | | | |
|---|---|---|---|---|---|---|---|---|---|---|---|
| Inv 5 | <0.0005 | — | — | — | — | <0.001 | 0.0016 | <0.003 | <0.00002 | 0.0276 | <0.0005 |
| Inv 6 | <0.0005 | — | — | — | — | <0.001 | 0.0017 | <0.003 | <0.00002 | 0.0028 | <0.0005 |
| Inv 7 | <0.0005 | — | — | — | — | <0.001 | 0.0015 | <0.003 | <0.00002 | 0.0023 | <0.0005 |
| Inv 8 | <0.0005 | — | — | — | 0.0005 | 0.001 | 0.0017 | <0.003 | <0.00002 | 0.0012 | <0.0005 |
| Inv 9 | <0.0005 | — | — | — | — | 0.005 | 0.0008 | <0.003 | 0.00003 | 0.0073 | <0.0005 |
| Inv 10 | <0.0005 | — | — | — | 0.0003 | 0.002 | 0.0009 | <0.003 | <0.00002 | 0.006 | <0.0005 |
| Inv 11 | <0.0005 | — | — | — | 0.0004 | 0.001 | 0.0007 | <0.003 | <0.00002 | 0.0062 | <0.0005 |
| Inv 12 | <0.0005 | — | — | — | 0.0008 | 0.002 | 0.0006 | <0.003 | <0.00002 | 0.014 | <0.0005 |
| Inv 13 | 0.00035 | — | — | — | — | 0.006 | 0.0016 | 0.002 | <0.00002 | <0.0005 | <0.0005 |
| Inv 14 | <0.0005 | — | — | — | — | 0.001 | 0.0005 | <0.003 | 0.00007 | 0.0103 | <0.0005 |
| Inv 15 | <0.0005 | — | — | — | — | 0.002 | 0.0015 | <0.003 | <0.00002 | 0.0046 | <0.0005 |
| Inv 16 | <0.0005 | — | — | — | 0.0003 | 0.001 | 0.0046 | <0.003 | <0.00002 | 0.0042 | <0.0005 |
| Inv 17 | <0.0005 | — | — | — | 0.0006 | <0.001 | 0.0095 | <0.003 | <0.00002 | 0.0044 | <0.0005 |
| Inv 18 | 0.0005 | — | — | — | — | 0.008 | 0.0012 | <0.002 | <0.00002 | <0.0005 | <0.0005 |
| Inv 19 | 0.00044 | — | — | — | 0.0003 | 0.007 | 0.0014 | 0.002 | <0.00002 | 0.0014 | <0.0005 |
| Inv 20 | <0.0005 | — | — | — | 0.0003 | 0.006 | 0.0007 | <0.003 | <0.00002 | 0.0081 | <0.0005 |
| Inv 21 | 0.0007 | — | — | — | 0.0003 | 0.006 | 0.001 | <0.003 | <0.00002 | 0.0048 | <0.0005 |
| Inv 22 | 0.0012 | — | — | — | 0.0004 | 0.004 | 0.0015 | <0.003 | 0.00004 | 0.0037 | <0.0005 |
| Inv 23 | 0.0024 | — | — | — | 0.0005 | 0.004 | 0.0027 | <0.003 | <0.00002 | 0.0028 | <0.0005 |
| Inv 24 | 0.001 | — | — | — | — | 0.005 | 0.0013 | 0.002 | <0.00002 | <0.0005 | <0.0005 |
| Ref 25 | <0.0005 | — | — | — | — | 0.003 | 0.0057 | <0.003 | <0.00002 | 0.0008 | <0.0005 |
| Ref 26 | <0.0005 | — | — | — | — | 0.004 | 0.0065 | <0.003 | <0.00002 | <0.0005 | <0.0005 |
| Inv 27 | <0.0005 | — | — | — | — | <0.001 | 0.0006 | <0.003 | <0.00002 | 0.0088 | <0.0005 |
| Inv 28 | <0.0005 | — | — | — | — | 0.001 | 0.0008 | <0.003 | <0.00002 | 0.0088 | <0.0005 |
| Inv 29 | <0.0005 | — | — | — | — | 0.001 | 0.0011 | <0.003 | <0.00002 | 0.0113 | <0.0005 |
| Inv 30 | <0.0005 | — | — | — | — | <0.001 | 0.0015 | <0.003 | <0.00002 | 0.0111 | <0.0005 |
| Inv 31 | <0.0005 | — | — | — | — | 0.001 | 0.0008 | <0.003 | <0.00002 | 0.0056 | <0.0005 |
| Inv 32 | <0.0005 | — | — | — | — | 0.002 | 0.0012 | <0.003 | <0.00002 | 0.0069 | <0.0005 |
| Inv 33 | <0.0005 | — | — | — | — | 0.001 | 0.0017 | <0.003 | <0.00002 | 0.0078 | <0.0005 |
| Inv 34 | <0.0005 | — | — | — | — | 0.003 | 0.0025 | <0.003 | <0.00002 | 0.0113 | <0.0005 |
| Inv 35 | <0.0005 | — | — | — | — | 0.003 | 0.0007 | <0.003 | <0.00002 | 0.0037 | <0.0005 |
| Inv 36 | <0.0005 | — | — | — | — | 0.002 | 0.001 | <0.003 | <0.00002 | 0.0045 | <0.0005 |
| Inv 37 | <0.0005 | — | — | — | — | 0.002 | 0.0019 | <0.003 | <0.00002 | 0.0052 | <0.0005 |
| Inv 38 | <0.0005 | — | — | — | — | 0.001 | 0.0023 | <0.003 | <0.00002 | 0.0064 | <0.0005 |
| Inv 39 | <0.005 | — | — | — | — | 0.006 | <0.0005 | <0.002 | <0.00002 | 0.0014 | <0.0005 |
| Inv 40 | <0.005 | — | — | — | — | 0.003 | <0.0005 | <0.002 | <0.00002 | 0.003 | <0.0005 |
| Inv 41 | <0.005 | — | — | — | — | 0.003 | <0.0005 | <0.002 | <0.00002 | 0.0017 | <0.0005 |
| Inv 42 | <0.005 | — | — | — | — | 0.002 | <0.0005 | <0.002 | <0.00002 | 0.0008 | <0.0005 |
| Inv 43 | <0.005 | — | — | — | — | 0.002 | <0.0005 | <0.002 | <0.00002 | 0.0011 | <0.0005 |
| Inv 44 | <0.0005 | — | — | — | — | 0.002 | 0.0006 | <0.003 | <0.00002 | 0.0016 | <0.0005 |
| Inv 45 | <0.0005 | — | — | — | — | 0.002 | 0.0005 | <0.003 | <0.00002 | 0.0024 | <0.0005 |
| Inv 46 | <0.0005 | — | — | — | — | 0.003 | 0.0005 | <0.003 | <0.00002 | 0.0007 | <0.0005 |
| Inv 47 | <0.0005 | — | — | — | — | 0.002 | 0.0006 | <0.003 | <0.00002 | <0.0005 | <0.0005 |
| Inv 48 | <0.0005 | — | — | — | — | 0.003 | 0.0013 | <0.003 | <0.00002 | 0.0020 | <0.0005 |
| Inv 49 | <0.0005 | — | — | — | — | 0.003 | 0.0013 | <0.003 | <0.00002 | 0.0017 | <0.0005 |
| Ref 50 | 0.004 | — | — | — | — | 0.003 | <0.0005 | <0.003 | <0.00002 | 0.0005 | <0.0005 |
| Ref 51 | 0.0053 | — | — | — | — | 0.003 | 0.0006 | <0.003 | <0.00002 | <0.0005 | <0.0005 |
| Ref 3 | <0.0005 | — | — | — | — | 0.002 | 0.0060 | <0.003 | <0.00002 | 0.0054 | <0.0005 |
| Ref 4 | 0.0027 | — | — | — | — | 0.0035 | <0.0005 | <0.003 | <0.00002 | 0.0020 | <0.0005 |
| Ref 5 | 0.0035 | — | — | — | — | 0.002 | <0.0005 | <0.003 | <0.00002 | 0.0014 | <0.0005 |
| Inv 52 | 0.0009 | 0.03 | — | — | — | 0.003 | <0.0005 | <0.003 | <0.00002 | 0.0005 | <0.0005 |
| Inv 53 | 0.0009 | 0.05 | — | — | — | 0.003 | <0.0005 | <0.003 | <0.00002 | <0.0005 | <0.0005 |
| Inv 54 | <0.0005 | — | — | — | — | 0.006 | <0.0005 | <0.003 | <0.00002 | 0.0011 | <0.0005 |
| Inv 55 | <0.0005 | — | — | — | — | 0.007 | <0.0005 | <0.003 | <0.00002 | 0.0032 | <0.0005 |
| Inv 56 | <0.0005 | — | 0.02 | — | — | 0.002 | <0.0005 | <0.003 | <0.00002 | 0.008 | <0.0005 |
| Inv 57 | <0.0005 | — | 0.015 | — | — | 0.004 | 0.0020 | <0.003 | <0.00002 | 0.002 | <0.0005 |
| Inv 58 | <0.0005 | — | 0.13 | — | — | 0.006 | 0.0015 | <0.003 | <0.00002 | 0.0015 | <0.0005 |
| Inv 59 | <0.0005 | — | — | 0.96 | — | 0.006 | <0.0005 | <0.003 | <0.00002 | 0.003 | <0.0005 |
| Inv 60 | <0.0005 | — | — | — | — | 0.002 | <0.0005 | <0.003 | <0.00002 | 0.0018 | 0.098 |
| Inv 61 | <0.0005 | 0.782 | 0.03 | — | — | 0.002 | <0.0005 | <0.003 | <0.00002 | 0.003 | <0.0005 |
| Ref 6 | <0.0005 | — | — | 3.46 | — | 0.005 | <0.0005 | <0.003 | <0.00002 | 0.002 | <0.0005 |

The preparation of the steels of the invention and reference steels, from which the samples in Table 1 were taken, was performed in accordance with the following scheme to obtain strip having a thickness of 0.4 mm.

The samples of the invention were prepared in the laboratory in a research vacuum induction furnace, in test cast pieces weighing a few kg (5 to 50 kg), with the exception of samples Inv 13, Inv 18, Inv 19 Inv 24, Inv 54, Inv 55, Inv 60 and Inv 61 that were prepared on industrial devices (a few tonnes), first by melting in an arc furnace, and subsequently by application of VIM and remelting VAR processes.

The samples Ref 1, Ref 2 and Ref 4 were prepared on industrial devices. The other reference samples Ref 3, Ref 5, Ref 6, Ref 25, Ref 26, Ref 50, Ref 51 were prepared in a laboratory under the same conditions as the laboratory-prepared samples of the invention.

The structures and inclusion populations evaluated on laboratory castings were very close to those obtained on industrial devices through similar preparation times. The differences in densities and size of the finest inclusions do not exceed 20% to the benefit of the laboratory castings (having regard to the ingot formats used) all else being unchanged. However, the studied castings are characterized by absence of remelting which goes towards offsetting the differences in respect of the preceding parameters and renders the laboratory test results reasonably comparable with the industrial test results. The ingots were then transformed to slabs via blooming to reduce thickness, bringing this thickness to between 200 and 100 mm.

Then, the slabs were hot rolled to a thickness of 3.5 mm after heating to about 1300° C. meaning that hot rolling took place from a temperature of 1285° C., taking into account the transfer time between the furnace and the rolling mill. The metal was subsequently pickled and cold rolled to a thickness of 0.4 mm or less. Austenitisation or solution annealing operations followed by recrystallization then ageing annealings were sometimes carried out at different steps of the production process and were respectively carried out at between 800 and 850° C. (for no more than 1 h), then between 850° C. and 1200° C. (for durations of less than 10 min) and finally between 420 and 550° C. for 30 min to 4 h.

Table 2 gives:

the size of the largest inclusions in each sample in Table 1, after hot rolling, observed on 650 mm$^2$ of these samples taken at sheet mid-width;

inclusion densities evaluated on a surface of 650 mm$^2$ under an optical microscope (OM) for inclusions larger than 4 μm;

and inclusion densities observed under scanning electron microscopy (SEM) by automated image analysis on industrially prepared samples, observed on surfaces of 100 to 400 mm$^2$ for inclusions larger than 1.5 μm.

The maximum dimensions of the particles observed were transcribed as equivalent inclusion diameter denoted «D circle D». It is to be understood that by «diameter» of the inclusions, it is meant «equivalent diameter» i.e. that of an inclusion which would have a circular cross-section and would have the same surface area of the observed inclusion if the latter has a more complex cross-section than that of a simple circle.

Also, since optical image analysis can only distinguish coloured contrasts and cannot differentiate between the composition of the inclusions, solely the absence of TiN (having an orange coloured contrast according the experience of skilled persons) was able to be verified under optical microscopy, as well as the inclusion densities of the various other evaluated particles for inclusions having a size larger than 4 μm. Finally, the inclusion populations were more precisely characterized by counting and automated analysis under scanning electron microscopy with field effect gun (MEB FEG) on surfaces of 200 to 400 mm$^2$ (with respective magnifications of ×300, ×1000, ×10 000), and the surface densities thereof evaluated. Therefore, the densities and type of inclusions in the samples prepared industrially were specified on hot rolled strips of 3.5 mm thickness. All densities were adjusted to surface densities (number of inclusions per mm$^2$).

TABLE 2

Size of the largest inclusions observed on hot rolled samples, and inclusion densities (for inclusions larger than 4 μm) of hot rolled samples under optical microscopy, and under scanning electron microscopy (for inclusions larger than 1.5 μm)

| | | Inclusion density (number per mm$^2$) | |
|---|---|---|---|
| | D circle max inclusion (μm) | OM (inclusions > 4 μm) | SEM (inclusions > 1.5 μm) |
| Ref 1 | 8 | 0.09 | 2.6 |
| Ref 2 | 8 | 0.5 | 15 |
| Inv 1 | 5 | 0.33 | |
| Inv 2 | 10 | 0.21 | |
| Inv 3 | 6 | 0.27 | |
| Inv 4 | 4 | 0.53 | |
| Inv 5 | 10 | 0.29 | |
| Inv 6 | 5 | 0.15 | |
| Inv 7 | 5 | 0.11 | |
| Inv 8 | 5 | 0.10 | |
| Inv 9 | 6 | 0.31 | |
| Inv 10 | 7 | 0.24 | |
| Inv 11 | 5 | 0.35 | |
| Inv 12 | 8 | 0.81 | |
| Inv 13 | 7 | 0.31 | 0.89 |
| Inv 14 | 8 | 0.32 | |
| Inv 15 | 5 | 0.19 | |
| Inv 16 | 10 | 0.28 | |
| Inv 17 | 10 | 0.32 | |
| Inv 18 | 10 | 0.29 | 1.10 |
| Inv 19 | 6 | 0.21 | 1.39 |
| Inv 20 | 5 | 0.48 | |
| Inv 21 | 10 | 0.30 | |
| Inv 22 | 10 | 0.32 | |
| Inv 23 | 10 | 0.42 | |
| Inv 24 | 7 | 0.45 | 1.10 |
| Ref 25 | 10 | 1.73 | |
| Ref 26 | 10 | 1.75 | |
| Inv 27 | 7 | 1.28 | |
| Inv 28 | 9 | 4.20 | |
| Inv 29 | 8 | 3.06 | |
| Inv 30 | 10 | 1.11 | |
| Inv 31 | 5 | 1.55 | |
| Inv 32 | 7 | 3.39 | |
| Inv 33 | 6 | 3.29 | |
| Inv 34 | 10 | 2.07 | |
| Inv 35 | 5 | 1.92 | |
| Inv 36 | 5 | 2.82 | |
| Inv 37 | 10 | 2.49 | |
| Inv 38 | 5 | 1.59 | |
| Inv 39 | 7 | 0.07 | |
| Inv 40 | 10 | 0.12 | |
| Inv 41 | 10 | 0.11 | |
| Inv 42 | 7 | 0.12 | |
| Inv 43 | 7 | 0.09 | |
| Inv 44 | 2 | 0.24 | |
| Inv 45 | 10 | 0.92 | |
| Inv 46 | 4 | 0.39 | |
| Inv 47 | 6 | 0.13 | |
| Inv 48 | 10 | 0.80 | |
| Inv 49 | 5 | 0.48 | |
| Ref 50 | 10 | 0.81 | |
| Ref 51 | 5 | 1.56 | |
| Ref 3 | 14 | 0.96 | |
| Ref 4 | 11 | 0.54 | 1.6 |
| Ref 5 | 11 | 0.69 | 2.1 |
| Inv 52 | 8 | 0.94 | |
| Inv 53 | 7 | 1.02 | |
| Inv 54 | 8 | 0.18 | |
| Inv 55 | 7 | 0.21 | |
| Inv 56 | 8 | 0.98 | |
| Inv 57 | 8 | 1.24 | |
| Inv 58 | 8 | 1.47 | |
| Inv 59 | 8 | 1.01 | |
| Inv 60 | 8 | 0.97 | |
| Ref 6 | 12 | 0.53 | |
| Inv 61 | 8 | 0.86 | |

These results show that, for the samples of the invention, small inclusion densities and complete absence of inclusions of relatively large size can be obtained by adjusting the composition of the materials and production methods, namely no inclusions larger than 10 µm on the hot rolled product, and optimally inclusion densities in the order of or below those of the references. Such inclusions are also absent in the sample of Reference 1, but the number of small oxide inclusions (5 to 10 µm in diameter) is significantly higher than in the industrial samples (for example) of the invention, which is detrimental to fatigue properties. Regarding the sample of Reference 2, this has a nitride density that is too high, including nitrides of size larger than 10 µm. This characteristic alone is a major impediment against reaching sufficient fatigue strength (on account of the size, the type and morphology of the nitrides) and it was considered unnecessary to examine the oxides of this sample.

The samples of the invention therefore only contain inclusions of small diameter and in low number (the relatively fine size of the inclusions required inclusion counts under scanning electron microscopy to evaluate a representative number of inclusions detectable by the resolution of the equipment and to obtain a precise estimate of dimensions above 1.5 µm). In particular, there is no Ti nitride that can particularly be related to the absence of Ti and to the very low content of N. The case is the same in the sample of Reference 1, although the inclusion density and the diameter of its largest inclusions are slightly higher than in the best cases of the invention. As for the sample of Reference 2, it is confirmed that nitrides (mainly Ti nitrides) are predominant therein and contained in the form of scarcely ductile inclusions and often of excessive size preventing the attaining of the objectives of excellent fatigue strength.

Similarly, Ref 4 and Ref 5, with increased S content, and Ref 3 and Ref 6 with high contents of Al and Y respectively, contain oxide inclusions of large size, larger than 10 µm hot rolled products.

Inclusion counts under optical microscopy were first initiated (for rapidity and ease of implementation) which soon reached their limit however on account of the small size of the inclusions and their low number. Also, optical microscopy used in the present invention for inclusions of oxides, sulfides or other types of particle, may introduce artefacts via confusion between the grey shades induced by sample preparation, surface pollution . . . if the count images are not properly sorted by an experimented observer. Automated inclusion counts and analyses using SEM and EDX were therefore preferred to obtain a more reliable representation of the surface density of inclusions in the industrial samples produced according to the invention.

It was therefore ascertained that, while the samples of the invention may exhibit inclusions having a maximum size smaller than in Reference 1 (free of Ti), most of the samples of the invention additionally exhibit inclusion densities, evaluated under scanning electron microscopy, that are lower than those of the Reference (evaluated under the same conditions). Therefore, the density of inclusions having a diameter larger than 1.5 µm under SEM observation is low, more than twice lower than that of Reference 1, and in addition the sizes of the largest particles observed on industrial castings are smaller (by about 1 µm) than observed in this Reference.

Table 2 allows the best composition domains to be specified with respect to the inclusion population of the steels of the invention.

The samples of the invention Inv 9 to 13 suggest that up to 4% Cu (when controlling production methods and the presence of residual elements according to the invention) the maximum size of the inclusions appears to be controlled.

Samples Inv 14 to 19, on the other hand, suggest preferred compositions with Nb contents of 2% or less and, within this composition range, carbon contents of less than 0.007%, to prevent the formation of carbides of size larger than 10 µm, or to give preference to the addition of other carbide-generating elements such as Cr (allowing higher carbon levels in the presence of Nb).

Samples Inv 20 to 24 suggest a manganese content of 4% or lower so as not to promote the formation of inclusions of size larger than 10 µm, and above this content, the need for precise control over the proportion of free carbon (preferably below 10 ppm).

The samples with low Co (with addition of aluminium and optionally addition of silicon and/or chromium), Ref 25, Ref 26, Inv 27 to 34, Inv 39 to 49, Inv 52, Inv 53, Inv 56 to 59, Inv 61, Ref 50 and Ref 51 have inclusions of diameter 10 µm or smaller (even 8 µm or smaller) in particular with associated oxygen contents lower than 16 ppm.

Persons skilled in the art know that cold working will only affect the size of inclusions downwardly, possibly via fractionation thereof, but cannot under any circumstances increase these dimensions.

The grades of the invention have the advantage, through their intrinsic chemical composition, that they do not form nitrides during production and allow the size and type of residual inclusions to be controlled, in particular oxides. By means of careful controlling of the raw materials used and the processing applied, leading to low contents of residual elements N, S, C and P, and by means of deoxidation of the liquid metal, the oxide particles formed are of limited size, of 10 µm or less, preferably less than 8 µm, and having adequate compositions obtained with the described processing ranges. Depending on the composition of the steel, aluminium oxides are formed e.g. mixed oxides of Al and Mg (this element inevitably being derived from slag and refractory materials of production equipment) or alumina alone, but also Si, Ca, Mg oxides or other mixed oxides; at times a few fine sulfides or carbides underpin these inclusion populations.

The important mechanical properties of the various samples are summarised in Tables 3, 4 and 5, Table 3 concerning samples at the hot rolled stage, Table 4 concerning all samples in the hot rolled state after an ageing annealing causing precipitation hardening, and Table 5 characterizing all the samples in the cold rolled and aged state (with a reference treatment at 480° C. for 3 h). The properties were measured in the longitudinal direction relative to the direction of rolling of the strip. These properties are Vickers HV 10 hardness (for the hot rolled samples), ultimate mechanical tensile strength Rm (expressed in MPa) for the aged hot rolled samples, the offset yield strength $Rp_{0.2}$ (expressed in MPa), uniform elongation Ar (expressed in % and measured on test pieces of length $L_0$ equal to 5.65 times the square root of the initial cross-section $S_0$) for cold rolled samples in aged and non-aged states.

TABLE 3

Vickers Hv 10 hardness of prepared samples in hot rolled state

|  |  | Hv | Mean | Standard Deviation |
|---|---|---|---|---|
| Ref 1 | measurement 1 | 308 | 312 | 3.2 |
|  | measurement 2 | 314 |  |  |
|  | measurement 3 | 313 |  |  |

TABLE 3-continued

Vickers Hv 10 hardness of prepared samples in hot rolled state

|  |  | Hv | Mean | Standard Deviation |
|---|---|---|---|---|
| Inv 13 | measurement 1 | 307 | 305 | 1.86 |
|  | measurement 2 | 304 |  |  |
|  | measurement 3 | 305 |  |  |
| Inv 18 | measurement 1 | 332 | 331 | 2.10 |
|  | measurement 2 | 329 |  |  |
|  | measurement 3 | 333 |  |  |
| Inv 19 | measurement 1 | 335 | 336 | 0.79 |
|  | measurement 2 | 336 |  |  |
|  | measurement 3 | 336 |  |  |
| Inv 24 | measurement 1 | 292 | 293 | 0.55 |
|  | measurement 2 | 293 |  |  |
|  | measurement 3 | 292 |  |  |
| Ref 3 | measurement 1 | 325 | 326 | 0.81 |
|  | measurement 2 | 326 |  |  |
|  | measurement 3 | 327 |  |  |
| Ref 4 | measurement 1 | 324 | 324 | 0.70 |
|  | measurement 2 | 325 |  |  |
|  | measurement 3 | 324 |  |  |
| Ref 5 | measurement 1 | 388 | 389 | 1.22 |
|  | measurement 2 | 390 |  |  |
|  | measurement 3 | 388 |  |  |
| Inv 53 | measurement 1 | 301 | 300 | 1.93 |
|  | measurement 2 | 298 |  |  |
|  | measurement 3 | 302 |  |  |
| Inv 56 | measurement 1 | 314 | 313 | 0.80 |
|  | measurement 2 | 312 |  |  |
|  | measurement 3 | 313 |  |  |
| Inv 57 | measurement 1 | 343 | 342 | 0.59 |
|  | measurement 2 | 342 |  |  |
|  | measurement 3 | 342 |  |  |
| Inv 58 | measurement 1 | 331 | 330 | 0.91 |
|  | measurement 2 | 331 |  |  |
|  | measurement 3 | 330 |  |  |
| Inv 59 | measurement 1 | 301 | 300 | 1.25 |
|  | measurement 2 | 300 |  |  |
|  | measurement 3 | 299 |  |  |
| Inv 60 | measurement 1 | 312 | 310 | 1.53 |
|  | measurement 2 | 310 |  |  |
|  | measurement 3 | 309 |  |  |
| Ref 6 | measurement 1 | 297 | 297 | 0.36 |
|  | measurement 2 | 297 |  |  |
|  | measurement 3 | 297 |  |  |
| Inv 61 | measurement 1 | 341 | 341 | 0.50 |
|  | measurement 2 | 341 |  |  |
|  | measurement 3 | 341 |  |  |

TABLE 4

Tensile strength Rm of samples in hot rolled, aged state

| Sample | Rm in hot rolled and aged state (MPa) |
|---|---|
| Ref. 1 | 2078 |
| Ref. 2 | 1860 |
| Inv. 1 | 1925 |
| Inv. 2 | 2097 |
| Inv. 3 | 951 |
| Inv. 4 | 590 |
| Inv. 5 | 1883 |
| Inv. 6 | 1941 |
| Inv. 7 | 2016 |
| Inv. 8 | 2136 |
| Inv. 9 | 1869 |
| Inv. 10 | 1870 |
| Inv. 11 | 1945 |
| Inv. 12 | 990 |
| Inv. 13 | 2067 |
| Inv. 14 | 1927 |
| Inv. 15 | 2026 |
| Inv. 16 | 1981 |
| Inv. 17 | 1479 |
| Inv. 18 | 2109 |
| Inv. 19 | 2198 |
| Inv. 20 | 1917 |
| Inv. 21 | 2068 |
| Inv. 22 | 630 |
| Inv. 23 | 510 |
| Inv. 24 | 886 |
| Ref. 25 | 489 |
| Ref. 26 | 544 |
| Inv. 27 | 1318 |
| Inv. 28 | 1342 |
| Inv. 29 | 1512 |
| Inv. 30 | 1379 |
| Inv. 31 | 1379 |
| Inv. 32 | 1406 |
| Inv. 33 | 1672 |
| Inv. 34 | 1794 |
| Inv. 35 | 1651 |
| Inv. 36 | 1724 |
| Inv. 37 | 1949 |
| Inv. 38 | 1984 |
| Inv. 39 | 1329 |
| Inv. 40 | 1388 |
| Inv. 41 | 1622 |
| Inv. 42 | 1606 |
| Inv. 43 | 1581 |
| Inv. 44 | 1498 |
| Inv. 45 | 1673 |
| Inv. 46 | 1661 |
| Inv. 47 | 1683 |
| Inv. 48 | 1659 |
| Inv. 49 | 1685 |
| Ref. 50 | 1702 |
| Ref. 51 | 1802 |
| Ref 3 | 2498 |
| Ref 4 | 2089 |
| Ref 5 | 2354 |
| Inv 52 | 1712 |
| Inv 53 | 1820 |
| Inv 54 | 2668 |
| Inv 55 | 2730 |
| Inv 56 | 2107 |
| Inv 57 | 2361 |
| Inv 58 | 2503 |
| Inv 59 | 2078 |
| Inv 60 | 2065 |
| Ref 6 | 2384 |
| Inv 61 | 2349 |

TABLE 5

Mechanical properties of samples in cold rolled state after rolling, and in cold rolled and aged state

| State | | Thickness mm | Width mm | Observed surface area mm² | Rm Mpa | Rp0.2 Mpa | Ar (%) | Hv 1 | | | HV 1 Mean |
|---|---|---|---|---|---|---|---|---|---|---|---|
| cold-rolled | Ref 1 | 0.42 | 7.00 | 2.92 | 1198.40 | 1126.50 | 5.73 | 369 | 372 | 370 | 370 |
| aged | | 0.42 | 7.00 | 2.93 | 2132.45 | 2101.70 | 2.63 | 622 | 621 | 618 | 620 |
| cold-rolled | Inv 13 | 0.42 | 7.00 | 2.94 | 1298.33 | 1274.00 | 5.50 | 378 | 373 | 375 | 375 |
| aged | | 0.42 | 7.00 | 2.93 | 2067.33 | 2041.00 | 3.13 | 595 | 604 | 600 | 600 |
| cold-rolled | Inv 18 | 0.416 | 7.00 | 2.91 | 1276.67 | 1254.67 | 5.87 | 371 | 373 | 370 | 371 |
| aged | | 0.42 | 7.00 | 2.92 | 2109.00 | 2092.00 | 1.77 | 622 | 624 | 618 | 621 |
| cold-rolled | Inv 19 | 0.43 | 7.00 | 2.98 | 1087.33 | 1071.67 | 9.73 | 328 | 330 | 324 | 327 |
| aged | | 0.43 | 7.00 | 3.00 | 2189.33 | 2172.00 | 1.97 | 615 | 625 | 617 | 619 |
| cold-rolled | Inv 24 | 0.42 | 7.00 | 2.97 | 1141.33 | 1109.00 | 9.80 | 365 | 371 | 369 | 368 |
| aged | | 0.42 | 7.00 | 2.94 | 885.67 | 388.67 | 42.60 | 185 | 177 | 179 | 180 |
| cold-rolled | Ref 3 | 0.42 | 7.00 | 2.96 | 1736.25 | 1685.26 | 6.34 | 512 | 514 | 510 | 512 |
| aged | | 0.42 | 7.00 | 2.94 | 2512.54 | 2483.70 | 3.75 | 740 | 740 | 739 | 739 |
| cold-rolled | Inv 54 | 0.42 | 7.00 | 2.92 | 1564.70 | 1532.63 | 7.56 | 461 | 461 | 460 | 461 |
| aged | | 0.42 | 7.00 | 2.91 | 2687.24 | 2654.23 | 5.02 | 791 | 790 | 790 | 790 |
| cold-rolled | Inv 55 | 0.42 | 7.00 | 2.93 | 1604.26 | 1576.35 | 7.32 | 329 | 334 | 331 | 331 |
| aged | | 0.42 | 7.00 | 2.94 | 2736.45 | 2704.68 | 4.71 | 804 | 805 | 806 | 805 |
| cold-rolled | Inv 56 | 0.42 | 7.00 | 2.92 | 1529.50 | 1492.10 | 5.68 | 452 | 452 | 451 | 451 |
| aged | | 0.42 | 7.00 | 2.92 | 2238.76 | 2204.30 | 4.12 | 659 | 658 | 658 | 658 |
| cold-rolled | Inv 57 | 0.42 | 7.00 | 2.94 | 1488.46 | 1445.98 | 3.84 | 438 | 439 | 438 | 438 |
| aged | | 0.42 | 7.00 | 2.92 | 2365.40 | 2340.28 | 2.83 | 696 | 696 | 698 | 697 |
| cold-rolled | Inv 58 | 0.42 | 7.00 | 2.93 | 1592.58 | 1567.36 | 5.24 | 468 | 468 | 469 | 468 |
| aged | | 0.42 | 7.00 | 2.91 | 2546.59 | 2516.36 | 3.57 | 749 | 748 | 750 | 749 |

The mechanical characteristics obtained on the samples of the invention in the aged hot and/or cold rolled state are close, even improved in comparison with the references. The grades of the invention therefore combine economic appeal (with lower material costs reducing the charging of Ti, Co . . . ) with high mechanical properties. For each alloy element Nb, Cu, Mn, W, Ta, V, an ultimate tensile strength in the aged state higher than 1950 MPa is accessible by adjusting the composition and method of implementation.

Table 4 illustrates values of Rm>2000 MPa on the hot rolled state for adjusted contents of addition elements, allowing martensitic structures to be obtained capable of ageing (for example, while Nb displays hardening properties of interest via samples Inv 14 to 19, Mn on the other hand suggests contents of 4% or lower and/or controlling of the Cr content added to prevent the formation of predominant austenite . . . ). In addition, the grades Inv 27 to 49, Inv 52 and Inv 61 of the invention suggest Co+Mo contents higher than 9%, preferably higher than 15% to reach mechanical properties in the aged state at least equivalent to those of references Ref 1 and Ref 3.

The compromise between these mechanical properties combined with a controlled inclusion population by means of careful processing conditions already illustrates the innovative nature of the invention, which goes together with improved surface properties after nitriding of the materials for applications subjected to fatigue stress.

The ageing conditions were tested on hot and cold rolled products to obtain optimisation thereof (after standardizing or solution annealing).

Solution annealing at 850° C. for 1 h in a reducing atmosphere was previously performed on each grade, providing a homogeneous structure. Different (time-temperature) pairs were experimented on these annealed materials to specify the ageing conditions adapted to targeted applications and the prepared grades.

Depending on the tested ageing conditions, under argon at between 420° C. and 550° C., the optimum values were specified in terms of hardness after ageing and the phases present.

The grades Inv 1 to 4, containing V, exhibit identical ageing conditions to those routinely used for References 1 and 2 (e.g. between 450° and 500° C. for ≤3 h treatments), and allow Rm values to be obtained in the aged state that are higher than 1900 MPa for V contents of ≤4%; the grades Inv 5 to 8 containing Ta exhibit increased mechanical characteristics (Rm>1940 MPa) on and after 0.5% of added Ta under similar ageing conditions. The grades Inv 9 to 13 containing Cu exhibit optimised ageing conditions in the region of 500° C. for ≤2 h treatments (or 480° C.-3 h) allowing Rm values to be obtained in the aged state higher than 1940 MPa over and above a 2% addition of Cu; these performance levels on ageing are increased in the presence of Cr (≤2%) and Mn (≤1%) together with structural hardening i.e. with contents of Co+Mo+Cu+Cr+Mn≤25%. The grades Inv 14 to 19 containing Nb exhibit higher mechanical characteristics than Ref 2 after ageing as soon as small proportions of Nb are added, this being so over a vast domain of ageing conditions from 420° C. to 550° C. for times of 30 minutes to 5 h. Optimum treatment at between 450° and 500° C. for 2 h is proposed.

The addition in controlled proportions of Cr and Mn increases age hardening. However, these grades require control over the content of Nb to prevent the formation of inclusion clusters or of particles having a size larger than the maximum values laid down by the invention. Therefore, an Nb content of ≤4% is imposed.

The grades Inv 20 to 24 and Ref 25 and 26 containing a notable amount of Mn (more than 0.19%) form the grades that can be dual-phased, requiring a mostly martensitic structure to be obtained to achieve optimal ageing. Therefore, grades with relatively limited Mn content (traces≤Mn≤4%) give access to values of Rm>1940 MPa with identical ageing conditions to those routinely used for References 1 and 2, (e.g. between 450° and 500° C. for treatments of ≤3 h). With these controlled proportions of Mn, the controlled addition of Al, Si or Cr increases age hardening provided a martensitic structure is maintained prior to ageing.

The grades Ref 25 and 26 lie outside the invention on account of their Mn content that exceeds 13.0%. The inclusion population thereof such as described in Table 2 is not optimal although remaining at the acceptable limit regarding maximum inclusion size: the largest inclusions have an equivalent diameter of 10 µm and their inclusion densities of 1.73 and 1.75 inclusions/mm² are among the highest for this size class. Table 4 shows that the Rm values thereof in the hot rolled and aged state are frankly low (489 and 544 MPa).

In the steels of the invention as in the reference steels, the mechanical properties of maraging steels are based on age hardening caused jointly by Co and Mo (and other addition elements). Therefore, low contents of Co (typically Co≤5%) and/or of Mo (typically Mo≤5%) do not allow Rm values to be obtained after ageing of more than 1530 MPa. The use of higher proportions of Co (between 5 and 16%) or of Mo (between 3 and 9%) provides access to higher levels of mechanical properties (tensile strength, fatigue endurance . . . ). These tendencies are confirmed by characterizations of samples Inv 39 to 49 (having Co contents of 2 to 7%), which show that the addition of Al, Si or Cr do not allow compensation in terms of Rm at the contents concerned i.e. for Co: 1.0 to 10.0 and Mo=about 5%; ultimate tensile strengths Rm after ageing of 1800 MPa cannot be exceeded irrespective of the additions of Al up to 1%, of Si up to 0.13%, of Ti up to 0.1%, or of Cr up to 0.5%.

The objective of the invention is to adjust the mechanical properties imparted to a given base metal via initial contents of elements Co and Mo selected in accordance with targeted performance, without deteriorating the inclusion population and fatigue behaviour of the materials, and at lower cost. In many of the examples of the invention, tensile strength Rm values higher than 1900 MPa after ageing are targeted and obtained, additionally with inclusions of defined controlled size, in particular to guarantee good fatigue behaviour. Other targets in respect of endurance and mechanical properties can be considered and obtained with different variants of the invention by adjusting the contents of the elements: Co, Mo, W, Cu, V, Nb, Mn, Si, Al, Cr, in particular.

For example, the grades Inv 27 to 38 containing relatively large amounts of W and Al can exhibit mechanical characteristics higher than Ref 2 after ageing with contents of W preferably higher than 0.8% and Co contents higher than 10%. This performance after ageing is increased with the addition of Al or Cr alongside structural hardening. Typically, ageing conditions identical to those routinely used for grades Ref 1 and 2 allow Rm values higher than 1940 MPa to be obtained in the aged state for the compositions of Inv 37 and Inv 38.

It will be noted that the grades Inv 48 and Inv 49 have Ti contents that are close to the acceptable limit (0.109%), that can be considered to be equivalent to 0.1% for rounding up and usual precision of analysis. They do not rank among the best for Rm values, and Inv 48 has a maximum equivalent inclusion diameter that borders the admissible and an inclusion density that is not optimal. These grades show that the limit of 0.1% for Ti must be heeded to remain within the scope of the invention.

The grades Ref 50 and Ref 51 have S contents (0.004 and 0.0053%) that exceed the admissible limit (0.002%). Their inclusion populations are therefore not optimal. Ref 50 has a maximum equivalent inclusion diameter of 10 µm, hence bordering on the admissible and an inclusion density of 0.81 inclusions/mm², which is relatively average. Ref 51 has smaller inclusions but that are more numerous. Their Rm values in the hot rolled and aged state are 1700 to 1800 MPa, which is not optimal. And the weakening of grain boundaries induced by these S contents that are a little too high make hot working more difficult than would be desirable.

Inv 52 and Inv 53 are comparable with Ref 50 and Ref 51, except that the S contents thereof are lower and conform to the invention. Their Rm in the hot rolled and aged state is therefore somewhat improved and they have better fatigue endurance and better hot workability.

Inv 54 and Inv 55 are characterized by their high Mo content (about 9.9 and 11.8%). They have superior mechanical properties. The contents of C, Al or Cr a little higher than in the other examples of the invention afford an acceptable quality/price ratio even if it is not optimal. These examples illustrate the effect of Mo on mechanical properties, but they only partly meet the economic objectives set by the invention.

Inv 56 represents a grade with high Al content. Inv 57 adds Cr thereto, and Inv 58 adds Cr and Zr in non-negligible amounts. These examples, by means of the cited added elements, exhibit properties of interest that can be optimised with the preferred contents previously set forth.

Inv 59 has high contents of Si and Y.

Ref 3 has an Al content that is too high and therefore contains inclusions that are too large and which could not be removed, and are therefore detrimental to the targeted applications subjected to fatigue stress.

Ref 4 and Ref 5 contain too much S which therefore forms too many sulfides which additionally act as germination sites for oxides, thereby accounting for the presence of too large inclusions on the hot rolled product.

Ref 6 has an excessive Y content which forms oxidized inclusions of too large size that were unable to be removed by settling of the liquid metal.

Inv 60 represents a strong presence of Ca, and Inv 61 a strong presence of Mg. They show that in the invention these two deoxidants can be used in non-negligible amounts provided heed is given to rules known to skilled persons in terms of properties of refractory materials and refining.

It is noteworthy here that the grades of the invention are compatible with ageing conditions that allow increased mechanical characteristics, but in addition they afford ease of implementation both in terms of processing and associated costs. The stability of the properties obtained, in particular hardness, allows the implementing of annealing operations of short duration (typically 30 minutes) to obtain properties that are identical to or comparable with those obtained with treatments lasting 2 to 5 h on conventional grades. These qualities of simplicity and savings in heat treatments are particularly advantageous for these targeted economical grades of the invention.

The novel grades of the invention have interesting mechanical properties (hardness, yield strength, breaking strength . . . ) that can be optimised for some applications of so-called «unlimited» endurance, intended to be subjected to strong fatigue stresses. Therefore, with these conditions of ageing and inclusion population optimised according to the invention, it is possible by means of subsequent surface treatments (nitriding, carbonitriding, carburization, shot peening . . . ), to achieve improved properties under dynamic yield stress, fatigue for example.

Finally, the improved properties of these grades of the invention were also tested after surface compression treatment. On materials of narrow thickness, subjected to fatigue, nitriding treatments were performed before stressing to delay initiation of surface cracking. This compression treatment can be carried out by shot peening in a manner known per se.

Various nitriding conditions were tested for the grades of the invention, including treatments at between 420 and 480° C. for 30 to 90 min in a gas atmosphere (cracked NH$_3$ atmosphere).

The nitrided layers were then formed by diffusion of nitrogen within the various cores, forming characteristic thicknesses of a few tens of μm, evaluated by chemical attack or depth profiling by glow discharge spectrometry (GDS). They sometimes contained fine, uniformly distributed precipitates of which the chemical nature can be adjusted if deemed necessary by acting on the composition of the steel and nitriding conditions.

FIG. 1 illustrates the density of the hardening phases obtained on sample Inv. 15 after nitriding at 420° C. for 30 min, characterized by thin section transmission electron microscopy. The hardening precipitates are essentially Mo$_x$-Nb$_y$ (with x=about 2y) having uniform distribution and size varying from 80 to 400 nm. A few carbides of Nb and Mo are also found, and nitrides of smaller size having specific stoichiometry and lattice parameters.

Over the time and temperature ranges investigated, the grades of the invention display increased surface properties after nitriding. Table 6 illustrates an example of the hardness levels evaluated via micro-indenting under identical conditions (average value of three Hv 0.1 surface measurements). The various nitriding conditions were investigated under cracked NH$_3$ gas nitriding; these conditions can also be adapted to ion nitriding, carbonitriding or others to obtain similar properties.

Hv0.1>900) and even, for some grades of the invention, gains in outermost surface hardness of more than 50 Hv0.1 are accessible with reduced nitriding times. Outermost surface hardness levels of more than 1000 Hv0.1 (even 1050 Hv0.1) can therefore be reached with the grades of the invention under adequate nitriding conditions that are not particularly demanding.

However, for some applications subjected to fatigue stress, it is recommended not to reach surface hardness levels that are too high (Hv0.1 hardness) in relation to the aged core of the material (Hv10 hardness) to prevent weakening the inner interface or outermost surfaces. For this purpose, nitrogen profiles with regular diffusion in the depth of the material are preferred to sharp diffusion profiles leading to the presence of heterogeneous, major precipitation areas on the surface. In steels, these domains are known as «compound layers», and are formed for example of fragile iron nitrides that are extremely hard. In this context, the presence of gas nitriding conditions was verified for the samples of the invention allowing the prevented formation of iron nitrides on the outermost surface whilst maintaining sufficient surface stresses to delay initiated cracking under dynamic stresses when in service (in the domains of targeted surface hardness).

Figure 2:
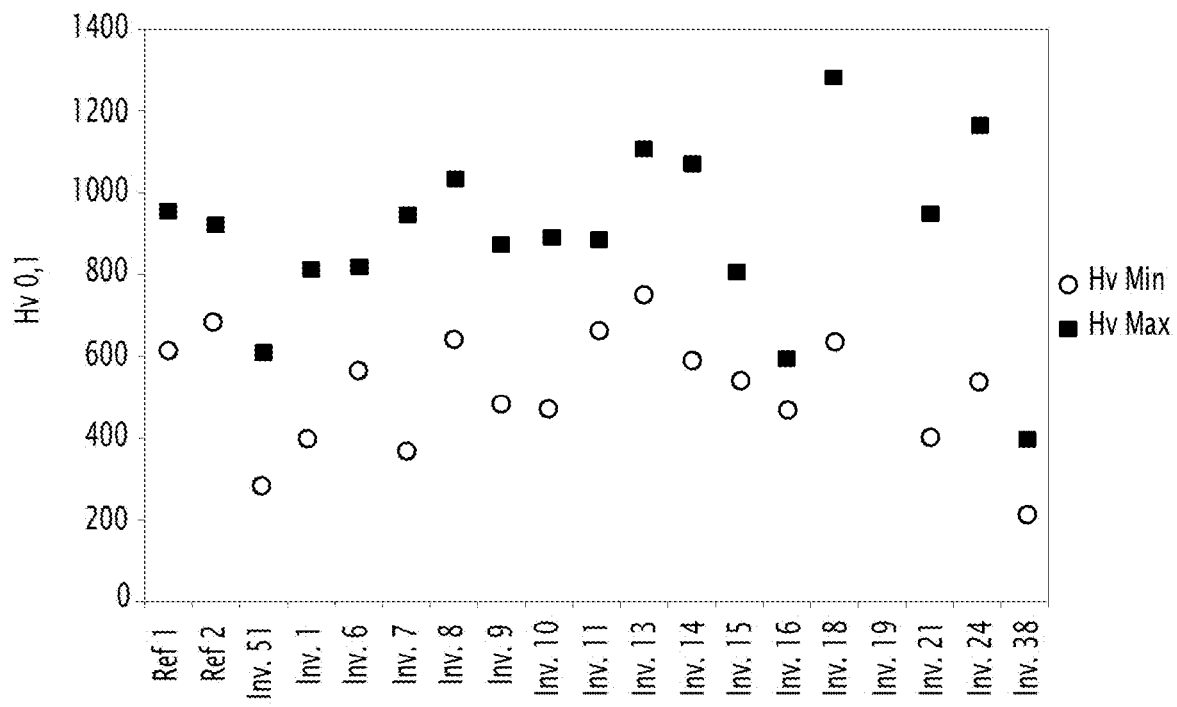
FIG. 2 illustrates characterization of the nitrided layers by measurement of levels of surface micro-hardness, performed on reference samples and samples of a steel according to the invention.

The minimum and maximum hardness values reached on the outermost surface (Hv0.1 hardness) for different nitriding conditions (temperature, time) are given in FIG. 2. It can be seen therein that outermost surface hardness levels higher than 900 Hv0.1 can be reached for each large family of

TABLE 6

Average Hv0-1 hardness values evaluated by outermost surface micro-indentation under different nitriding conditions.

| | 420° C. | | | 450° C. | | | 480° C. | | | 510° C. |
|---|---|---|---|---|---|---|---|---|---|---|
| | 30 min | 60 min | 90 min | 30 min | 60 min | 90 min | 30 min | 60 min | 90 min | 30 min |
| Ref 1 | 623 | 949 | 613 | 794 | 911 | 943 | 820 | 930 | 890 | 792 |
| Ref 2 | 775 | 730 | | 923 | 843 | | 900 | | | 680 |
| Ref 51 | 325 | 320 | | 488 | 285 | | 355 | | | 613 |
| Inv 1 | 643 | 643 | | 698 | 808 | | 790 | | | 403 |
| Inv 6 | 623 | 735 | | 815 | 608 | | 623 | | | 575 |
| Inv 7 | 578 | 370 | | 588 | 620 | | 940 | | | 787 |
| Inv 8 | 1033 | 475 | | 778 | 638 | | 920 | | | 747 |
| Inv 9 | 803 | 875 | | 623 | 670 | | 485 | | | 762 |
| Inv 10 | 705 | 888 | | 530 | 810 | | 805 | | | 475 |
| Inv 11 | 803 | 658 | | 665 | 885 | | 755 | | | 777 |
| Inv 13 | 325 | 870 | 910 | 995 | 835 | 1025 | 1030 | 900 | 908 | |
| Inv 14 | 853 | 1070 | | 730 | 593 | | 875 | | | 743 |
| Inv 15 | 810 | 790 | | 568 | 543 | | 665 | | | 713 |
| Inv 16 | 523 | 590 | | 580 | 490 | | 473 | | | 598 |
| Inv 18 | 750 | 1280 | 635 | 1018 | 885 | 653 | 1088 | 815 | 890 | |
| Inv 21 | 558 | 548 | | 405 | 815 | | 823 | | | 837 |
| Inv 24 | 380 | 1160 | 305 | 1030 | 320 | 543 | 380 | 908 | 625 | |
| Inv 38 | 220 | 215 | | | 275 | | | | | 280 |
| Ref 3 | 748 | | | 882 | | | 1019 | | | 1048 |

It is to be understood that the measurement uncertainties for these types of tests are high when, as is the case here, the tests are performed on samples with rough surfaces and local imprints. The results in Table 7 must therefore be interpreted in terms of general trend.

Therefore, in addition to excellent mechanical properties, controlled material costs and controlled inclusion population, the samples of the invention exhibit nitridability that leads to increased levels of surface hardness and increased resistance to friction compared with the samples of References 1 and 2. As result, outermost surface hardness levels similar to References 1 and 2 can be expected (e.g.

hardening element present according to the invention. It is therefore possible to attain fatigue surface properties at least equivalent to those of the previously cited References.

It is ascertained that the grades with Mn or Cu produced on industrial tooling with quantified addition of Cr may exhibit increased outermost surface hardness after nitriding compared with the grades of the invention free of Cr, and that a similar effect can be expected by adding defined proportions of Al together with a hardening element (such as Ta, see Inv 8).

Therefore, with sufficient Co and Mo levels to obtain the targeted mechanical properties detailed in the foregoing, the invention illustrates the possible reaching of outermost surface hardness values higher than 900 HV0.1 for each family of grades, on the following basis:

- values lower than 900 Hv0.1 were observed on grades with vanadium when contents of hardening elements were lower than 0.5%; above this value increased hardness values are expected on the outermost surface;
- for the grades with tantalum according to the invention (Inv 6 to 8 in Table 7) hardness values higher than 940 Hv0.1 were reached on outermost surfaces as from the addition of 3% Ta (with adjusted nitriding conditions);
- the grades with Cu also exhibited increased hardness levels (and residual stresses) on the outermost surface as from a 2% addition of hardening element and in the presence of Cr and Mn (Inv 13); these elements promoting nitrogen solubility on the surface;
- the grades of the invention 14 to 18, on the other hand, suggest vanadium levels lower than 2% to attain sufficient hardness levels on the outermost surface (devoid of compound layer);
- grades with Mn exhibiting a good compromise between mechanical properties/inclusion population show increased hardness levels on the outermost surface in the presence of Cr (Inv 24);
- the tests with grades with W and Al (Inv 38 and Ref 51) have not yet allowed determination of the nitriding conditions allowing high hardness levels to be reached on the outermost surface.

Finally, it was verified that these accessible high surface hardness values are accompanied by controlled residual stresses (evaluated by X-ray diffraction) allowing compression of the surface in relation to the core, and thereby delaying initiation of surface cracking.

Figure 3:
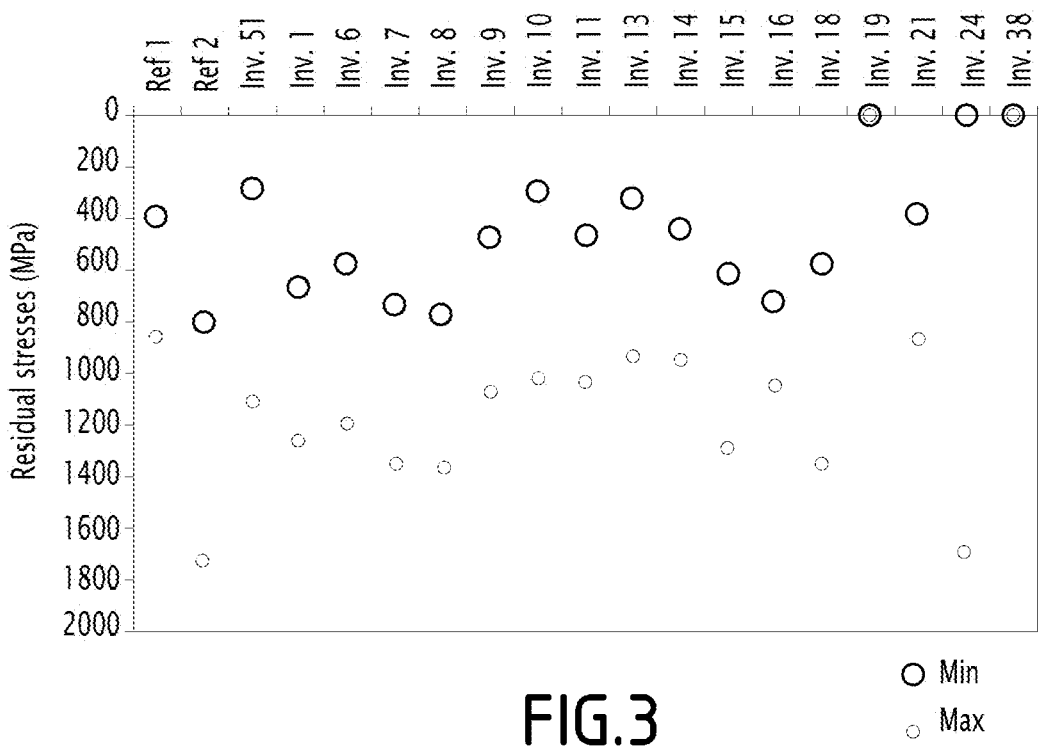
FIG. 3 illustrates characterization of the nitrided layers by measurement of residual surfaces stresses, performed on reference samples and on samples of a steel of the invention.

FIG. 3 gives a qualitative evaluation of residual compression stresses on the surface of nitrided rolled sheet, for samples Ref 1, Ref 2, and various samples of the invention. For each sample, the minimum and maximum values are given of the evaluated compression stresses for all the tests conducted with variations in temperature and nitriding times. Evaluation of residual stresses within the nitrided layers was performed on the surface of the samples by X-ray diffraction with the following parameters: Chi varying from 0 to 51°, measurement interval 1s, $\sin^2$ (psi) of 0 to 0.6 per pitch of 0.1. The values obtained under these conditions allowed determination of stress levels on the surface of the material by monitoring changes in the position of the Fe line. It can be seen that the residual stresses of the samples of the invention are improved compared with those observed on the samples of Reference 1.

It is therefore easier, when applying the invention, to control the properties of the nitrided layer and hence to adapt this layer to the particular needs of an envisaged use of future products. If considered preferable, it is therefore easy to avoid the presence on the outermost surface of phases commonly called «compound layers» in the nitrided layer. These phases result from the precipitation of iron nitrides particularly of type $Fe_4N$, $Fe_2N$, $Fe_2N_{1-x}$.

The characterizations of the nitrided layers of some samples (of reference Ref 1 and of the invention Inv 13, Inv 18, Inv 21 and Inv 24) were completed by performing tests commonly known as «scratch tests», derived from «sclerometer tests» and differing therefrom through the low load applied.

For these tests, a spherical-conical tip is pressed through the nitrided layer/substrate system, such as a diamond tip for Rockwell C hardness tests (angle of 120°, curvature radius of the tip 100 μm), applying a constant substrate travel speed under an increasing load at the tip.

The degradation of a coating under application of a load is a combination of elastic and/or plastic indenting stresses, friction stresses and internal residual stresses of the material.

Under low loads, these stresses may be the cause of tensile or compressive cracking of the coating surface, which nevertheless continues to adhere to the substrate.

The scratch test is a comparative test allowing detection of a sound wave on propagation of micro-cracks, if any, in the material, detection of the indent depth of the pressed indenting tool (in relation to the initially palpated true surface) and allows evaluation of the residual depth of the coating on the indentation pathway after the test. This latter estimation allows evaluation of the elastic return of the coating/substrate system or surface/substrate system after application of an increasing low load.

On each system, three successive measurements were conducted on the surface of the nitrided samples, with 1 mm spacing, by applying a load increasing from 0.03 to 10 N over a nitrided surface of 10 mm.

While, for the various samples of the invention, the results scarcely differ in terms of evaluation of normal force, or indent depths, some characteristics of the nitrided layers of the invention show differences, nevertheless.

Figure 4:
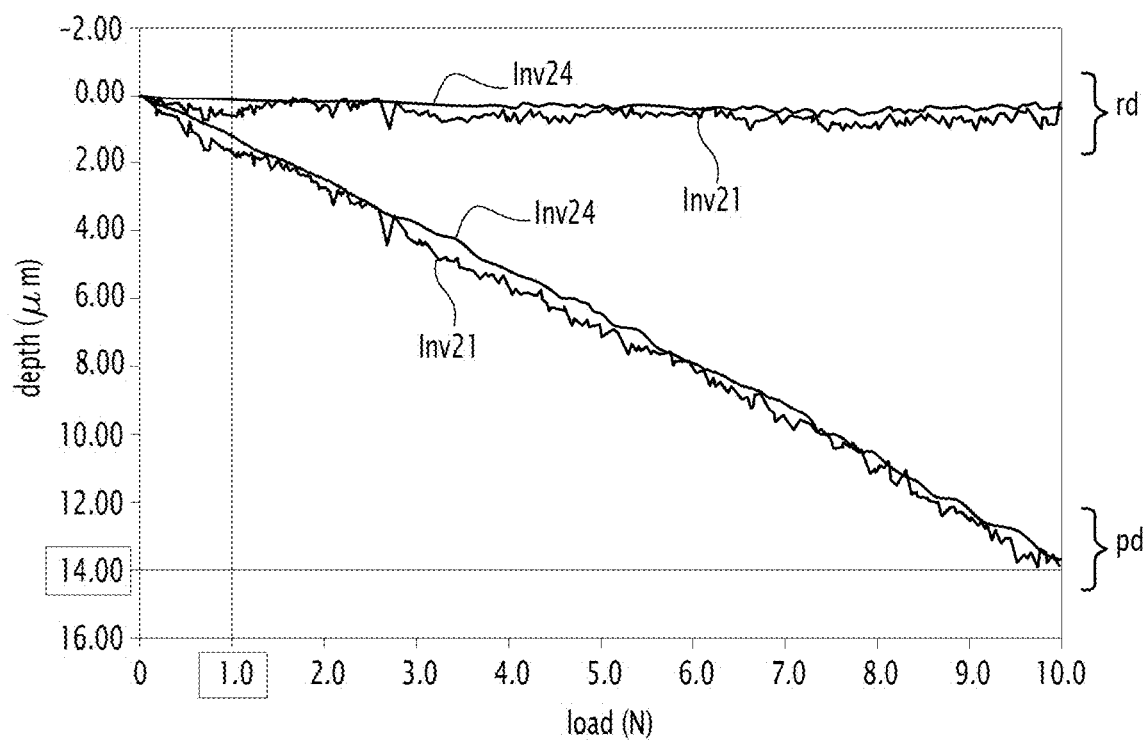
FIG. 4 illustrates the elastic behaviour of the nitrided layer at indent depths and residual depths when performing scratch tests on two samples of the invention in the nitrided state.

For example, FIG. 4 illustrates the elastic return of the nitrided layer/substrate system after the scratch test via the relative difference between indent depths (significantly decreasing curves) and residual depths after the scratch test on the nitrided samples Inv. 21 and Inv. 24 (respectively treated at 480 and 450° C. for 30 minutes in a gas atmosphere).

Inv 21 is an example containing Mn (1.970%) where the content of Cr (0.007%) only results from impurities contained in the raw materials used. Inv 24 is an example containing 1.930% Mn, hence a content comparable with that of Inv 21, but associated with a Cr content of 0.902%, therefore corresponding to a very significant addition of Cr. These two samples give comparable results for indent depths during the pressing phase of the scratch test, but the curves are more irregular for Inv 21 than for Inv 24.

Figure 5:
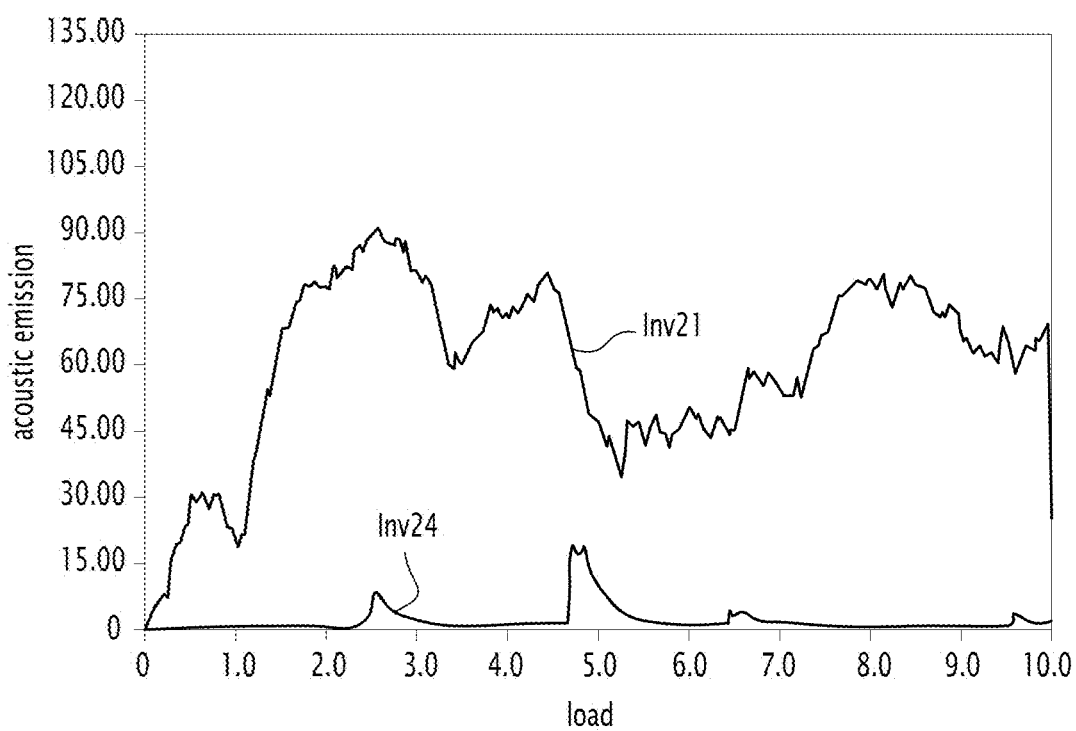
FIG. 5 illustrates changes in acoustic emission when performing scratch tests under increasing loads on the same samples as those in FIG. 4.

FIG. 5 illustrates the associated results of acoustic emission during the scratch test on these two same nitrided samples Inv 21 and Inv 24. Here the differences are distinctly more significant, these emissions being higher for Inv 21 than for Inv 24.

Therefore, the addition of Mn associated with an addition of Cr displays lesser noise at the evaluated depths, which tallies with the significant reduction in acoustic emission of nitrided Inv. 24 (FIG. 5).

Such behaviour was also observed on other grades of the invention containing Cr.

It therefore follows that the significant presence of Cr reduces potential cracking of the nitrided layers of the grades of the invention under the application of low loads (≤10 N), which is particularly the case for fatigue-stressed parts subjected to local rubbing, pressing or friction when in use.

Figure 6:
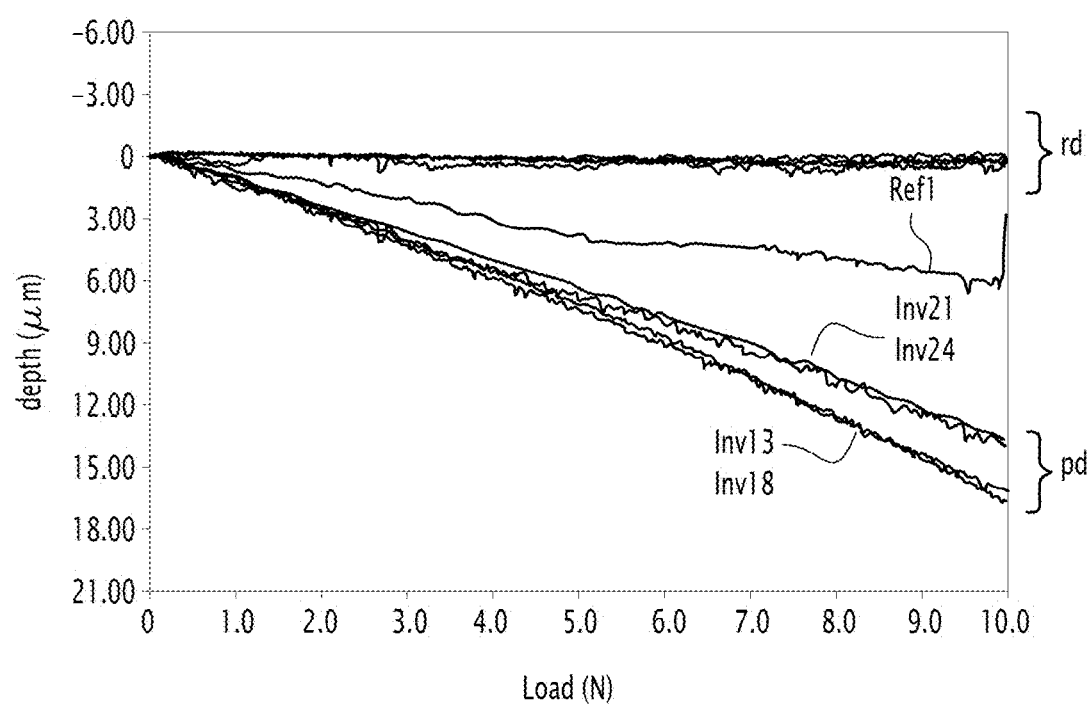
FIG. 6 illustrates the elastic behaviour when performing scratch tests on four samples of the invention and one reference sample, all in the nitrided state.

Similarly, FIG. 6 illustrates the elastic behaviour of the nitrided layer/substrate assembly after the scratch test on the nitrided samples Inv. 13, Inv. 18, Inv. 21 and Inv. 24, in comparison with sample Ref 1 (mean curves over three tests performed per sample, respectively treated in a gas atmosphere at 480° C.-30 minutes for Inv. 13, Inv 18, Inv 21 and Ref 1, and at 450° C.-30 minutes for Inv 24). The offsetting of the curves from the X-axis of the curves of residual depths illustrates the residual plastic deformation after the test.

FIG. 6 shows increased elastic behaviour of the nitrided layers of the samples of the invention, compared with that of the nitrided layers obtained on Ref 1. The elastic return evaluated by the difference between the curves of indent depths and residual depths is significantly increased for the samples containing Cu (Inv 13 which also contains Cr) or Nb (Inv 18). There is a variation in height of about 15 μm thickness for these samples and of 13 μm for the grades with Mn (Inv. 21) and Mn+Cr (Inv 24 which also contains some Si), hence twice higher than for Ref 1 which does not contain these alloying elements and hays a Co content (16.50%) higher than that of the tested samples of the invention (in the order of 13%). The Mo contents are in the order of 5.0 to 5.30% for all these samples.

In addition, the evaluated residual depths rd are small for the samples of the invention Inv 13, Inv 18, Inv 21, Inv 24, and slightly better than for Ref 1.

This behaviour is a sign of improved elastic return for the nitrided layers of the invention, which is of major interest for applications in which parts are subjected to fatigue, since it allows a reduction in the plastic deformation of the substrate/nitrided layer assembly, and thereby a reduction in rubbing and friction generated in some applications by plastic deformation of assemblies requiring precise dimensioning.

Therefore, for application to CVT belts, formed of superimposed rings in cold rolled maraging steel, and subjected to be bending and tensile fatigue by engine-transmitted torque, the gap between each ring ensures lubrication of the assembly and does not tolerate plastic deformation which would risk damaging the rings under cyclic stresses. After each stress cycle, the nitrided materials of the invention are less deformed plastically, and do not induce accumulated plastic deformation of the parts over time, which over the longer term could deteriorate the fatigue lifetimes of the reference nitrided materials.

FIG. 6 confirms the greater plastic deformation under low load, 10 N, of the nitrided layers derived from Ref 1 compared with that incurred by the samples of the invention. This is demonstrated by the offset from the horizontal axis 0 of the different curves of residual penetration depths.

Ref 1 appears to deform less than the grades of the invention at the scratch test (as shown by their relative indent depths) but the mechanisms of deformation involved are not fully the same, and the residual stresses after this loading do not generate the same effects. For example, while the deformation generated on Ref 1 during the test appears to be smaller (from the evaluated indent depth), its resultant after the test shows an increased plastic component compared with the samples of the invention, which is detrimental to the applications primarily targeted by the invention.

The indent depths observed on the samples of the invention prove to be essentially elastic, unlike Ref 1 which exhibits less elastic return under a low load.

These behaviour criteria of the nitrided surface, associated with a controlled inclusion population and mechanical properties inherent in the composition of the steel, were not evidenced by previous studies conducted on maraging steels of general type concerned by the invention, in particular with a view to use in transmission belts of CVT type.

In general, the steels of the invention under different nitriding conditions display increased economic performance and properties of use that are equivalent to and even increased compared with the prior art Reference steels, insofar as the nitrided layer is more easily controlled in respect of:

composition, in particular concerning the existence or non-existence of compound layers;
thickness;
reachable hardness levels under given nitriding conditions;
distribution, within the thickness of the layer, of nitrogen contents, of precipitated phases, type and distribution thereof, hardness levels, residual stresses;
reduced (practically zero) level of plastic deformation induced in these nitrided layers, under low load stressing;
ease and economics of industrial implementation of nitriding, with the obtaining of properties equivalent to those of the Reference grades, whether nitriding is plasma nitriding or more especially gas nitriding.

Priority applications of the invention are in particular:
for products derived from hot rolled or hot formed semi-finished products: turbine shafts or transmission parts in general; but also blades of rotating machinery (wind turbines, centrifuges . . . );
for products derived from cold rolled sheet or strip: elements of vehicle transmission belts or of rotating machines such as machine-tools, in particular for automatic vehicle transmissions of CVT type.

The invention claimed is:

1. Steel, having the following composition in weight percent:
   $10.0\% \leq Ni \leq 24.5\%$;
   $1.0\% \leq Mo \leq 12.0\%$;
   $1.0\% \leq Co \leq 18.0\%$;
   $14.0\% \leq Mo+Co+Si+Mn+Cu+W+V+Nb+Zr+Y+Ta+Cr+C+Al+B+Ti+N \leq 29.0\%$;
   $21.5\% \leq Ni+Co+Mo \leq 47.5\%$;
   traces $\leq Al \leq 4.0\%$;
   traces $\leq Ti \leq 0.1\%$;
   traces $\leq N \leq 0.010\%$;
   traces $\leq Si \leq 4.0\%$;
   traces $\leq Mn \leq 13.0\%$;
   traces $\leq C \leq 0.03\%$;
   traces $\leq S \leq 0.0020\%$;
   traces $\leq P \leq 0.005\%$;
   traces $\leq B \leq 0.01\%$;
   traces $\leq H \leq 0.0005\%$;
   traces $\leq O \leq 0.03\%$;
   traces $\leq Cr \leq 5.0\%$;
   traces $\leq Cu \leq 4\%$;
   traces $\leq W \leq 6.0\%$;
   traces $\leq Zr \leq 4.0\%$;
   traces $\leq Ca \leq 0.1\%$;
   traces $\leq Mg \leq 0.8\%$;
   traces $\leq Nb \leq 4.0\%$;
   traces $\leq V \leq 4.0\%$;
   traces $\leq Ta \leq 4.0\%$;
   traces $\leq Y \leq 4.0\%$;
   and the inclusion population observed under image analysis on a polished surface of 650 mm² if the steel is in the form of a hot worked part or hot rolled sheet, and 800 mm² if the steel is in the form of cold rolled sheet, does not contain non-metallic inclusions having an equivalent diameter larger than 10 μm.

2. Method for producing a steel product, wherein:
a remelting electrode is prepared in steel having a composition conforming to that in claim 1;
this electrode is remelted using a single or multiple remelting process to obtain a remelted electrode;

the remelted electrode is subjected to at least one hot working at a temperature of between 1050 and 1300° C., to obtain hot worked sheet or hot worked strip;

and optionally heat treatment is applied to said hot worked sheet or said hot worked strip.

3. The method according to claim 2, wherein said hot worked sheet or said hot worked strip is then cold rolled with one or more passes to obtain sheet or strip having a thickness of 2 mm or less.

4. The method according to claim 3, wherein the sheet or strip is subjected to at least one heat treatment between two cold roll passes and/or after the last cold roll pass.

5. The method according to claim 3, wherein the accumulated cold roll rate of the various passes is at least 30%.

6. The method according to claim 2, wherein said hot worked sheet or strip, optionally heat treated, has Vickers hardness of 285 Hv10 or higher, this hardness being evaluated along a cross-section of the part or hot worked sheet.

7. The method according to claim 2, wherein said hot or cold rolled sheet or strip, optionally heat treated, has at least 70% martensitic structure, tensile strength of 2030 MPa or higher, an offset yield strength of 2000 MPa or higher and uniform elongation of 1% or higher.

8. The method according to claim 2, wherein said hot or cold rolled sheet or strip, optionally heat treated, is cut and optionally formed.

9. The method according to claim 8, wherein said hot or cold rolled sheet or strip, optionally heat treated, cut and optionally formed, is subjected to hardening treatment at between 400 and 600° C. for 30 min to 5 h.

10. The method according to claim 9, wherein said optionally heat-treated sheet or strip, cut and optionally formed is subjected, after hardening, to surface treatment to improve the dynamic yield strength thereof.

11. The method according to claim 10, wherein said surface treatment is carburization, or gas nitriding, or ion nitriding, or carbonitriding or shot peening.

12. The method according to claim 2, wherein the grain size of the hot rolled sheet or strip, optionally heat treated, or of the cold rolled sheet or strip optionally heat treated, is 5 ASTM or finer.

13. Steel product that is hot worked and optionally heat treated, which has the following composition in weight percent:
10.0%≤Ni≤24.5%;
1.0%≤Mo≤12.0%;
1.0%≤Co≤18.0%;
14.0%≤Mo+Co+Si+Mn+Cu+W+V+Nb+Zr+Y+Ta+Cr+C+Al+B+Ti+N≤29.0%;
21.5%≤Ni+Co+Mo≤47.5%;
traces ≤Al≤4.0%;
traces ≤Ti≤0.1%;
traces ≤N≤0.010%;
traces ≤Si≤4.0%;
traces ≤Mn≤13.0%;
traces ≤C≤0.03%;
traces ≤S≤0.0020%;
traces ≤P≤0.005%;
traces ≤B≤0.01%;
traces ≤H≤0.0005%;
traces ≤O≤0.03%;
traces ≤Cr≤5.0%;
traces ≤Cu≤4%;
traces ≤W≤6.0%;
traces ≤Zr≤4.0%;
traces ≤Ca≤0.1%;
traces ≤Mg≤0.8%;
traces ≤Nb≤4.0%;
traces ≤V≤4.0%;
traces ≤Ta≤4.0%;
traces ≤Y≤4.0%;
the remainder being iron and manufacturing impurities;

and the inclusion population observed under image analysis on a polished surface of 650 mm$^2$ of a hot worked part or of hot rolled sheet does not contain non-metallic inclusions having an equivalent diameter larger than 10 μm.

14. The steel product hot worked according to claim 13, optionally heat treated, wherein it has at least 70% martensitic structure, tensile strength of 2030 MPa or higher, offset yield strength of 2000 MPa or higher and uniform elongation of 1% or higher, and Vickers hardness of 285 Hv10 or higher, this hardness being evaluated along a cross-section of the hot worked product.

15. Hot or cold rolled and, optionally, heat treated sheet or strip according to claim 13, wherein it has tensile strength 2030 MPa or higher, offset yield strength of 2000 MPa or higher, and uniform elongation of 1% or higher.

16. Steel product, wherein it is derived from hot or cold rolled sheet or strip according to claim 13, optionally formed, and in that it has undergone surface treatment to improve the dynamic strength thereof.

17. The product according to claim 16, wherein said surface treatment is selected from among carburization, gas nitriding, ionic nitriding, carbonitriding and shot peening.

18. Turbine shaft or hot worked transmission part, wherein said shaft or said part comprises at least one element made from a hot worked product according to claim 13.

19. Steel product that has been hot worked and optionally heat treated according to claim 13, wherein the grain size of the product or of the sheet or strip is 5 ASTM or finer.

20. Cold rolled sheet or strip in steel, which has the following composition in weight percent:
10.0%≤Ni≤24.5%;
1.0%≤Mo≤12.0%;
1.0%≤Co≤18.0%;
14.0%≤Mo+Co+Si+Mn+Cu+W+V+Nb+Zr+Y+Ta+Cr+C+Al+B+Ti+N≤29.0%;
21.5%≤Ni+Co+Mo≤47.5%;
traces ≤Al≤4.0%;
traces ≤Ti≤0.1%;
traces ≤N≤0.010%;
traces ≤Si≤4.0%;
traces ≤Mn≤13.0%;
traces ≤C≤0.03%;
traces ≤S≤0.0020%;
traces ≤P≤0.005%;
traces ≤B≤0.01%;
traces ≤H≤0.0005%;
traces ≤O≤0.03%;
traces ≤Cr≤5.0%;
traces ≤Cu≤4%;
traces ≤W≤6.0%;
traces ≤Zr≤4.0%;
traces ≤Ca≤0.1%;
traces ≤Mg≤0.8%;
traces ≤Nb≤4.0%;
traces ≤V≤4.0%;
traces ≤Ta≤4.0%;
traces ≤Y≤4.0%;
the remainder being iron and manufacturing impurities;

and the inclusion population, observed under image analysis on a polished surface of 800 mm$^2$, does not contain non-metallic inclusions having an equivalent diameter larger than 10 μm.

21. Cold rolled sheet or strip according to claim 20, wherein it has been subjected to at least one heat treatment after cold rolling to harden the material.

22. Transmission belt, which comprises at least one element made from cold rolled sheet or strip according to claim 20, or from a product derived from said sheet or strip.

23. The transmission belt according to claim 22, which is an automotive CVT transmission belt.

* * * * *